US012557786B2

(12) United States Patent
Honchariw et al.

(10) Patent No.: US 12,557,786 B2
(45) Date of Patent: Feb. 24, 2026

(54) METHOD FOR AUTONOMOUSLY TRAINING AN ANIMAL TO RESPOND TO ORAL COMMANDS

(71) Applicant: Companion Labs, Inc., San Francisco, CA (US)

(72) Inventors: John Honchariw, San Francisco, CA (US); David Roberts, San Francisco, CA (US); Brian Eiseman, San Francisco, CA (US); Paul Mundell, San Francisco, CA (US); Michael Maynard, San Francisco, CA (US)

(73) Assignee: Companion Labs, Inc., San Francisco, CA (US)

( * ) Notice: Subject to any disclaimer, the term of this patent is extended or adjusted under 35 U.S.C. 154(b) by 266 days.

(21) Appl. No.: 17/538,242

(22) Filed: Nov. 30, 2021

(65) Prior Publication Data

US 2022/0087221 A1    Mar. 24, 2022

Related U.S. Application Data

(63) Continuation of application No. 16/418,596, filed on May 21, 2019, now Pat. No. 11,576,348.

(Continued)

(51) Int. Cl.
*A01K 15/02*          (2006.01)

(52) U.S. Cl.
CPC .......... *A01K 15/021* (2013.01); *A01K 15/025* (2013.01)

(58) Field of Classification Search
CPC ...... A01K 15/021; A01K 15/025; A01K 5/02; A01K 5/0114; A01K 15/02; A01K 5/0291; A01K 15/022

(Continued)

(56) References Cited

U.S. PATENT DOCUMENTS 6,263,836 B1    7/2001  Hollis
8,347,817 B1 *  1/2013  Miller .................. A01K 5/0291
                                                                119/57.91

(Continued)

FOREIGN PATENT DOCUMENTS

WO    2006044828 A3    10/2006
WO    2014134606 A1     9/2014
WO    2017193246 A1    11/2017

OTHER PUBLICATIONS

IPRP received in PCT/US19/33338 dated Dec. 3, 2020.

(Continued)

*Primary Examiner* — Peter M Poon
(74) *Attorney, Agent, or Firm* — Run8 Patent Group, LLC; Peter Miller; Leah Raddatz

(57)          ABSTRACT

One variation of a method for autonomously training animals to respond to oral commands includes: prompting a user to select a training protocol; prompting the user to record a first audio clip of the user reciting a voice command associated with a target pose within the training protocol, the user affiliated with the animal; accessing a video feed recorded by an optical sensor during a first training session; in the video feed, detecting the animal within a working field; while the animal is detected in the working field, playing back the first audio clip; in the video feed, detecting a current pose of the animal; calculating a deviation between the current pose of the animal and the target pose; in response to the deviation falling within a threshold: playing an audio clip of a secondary reinforcer; and dispensing a unit of a primary reinforcer via an integrated dispenser.

20 Claims, 4 Drawing Sheets

Related U.S. Application Data

(60) Provisional application No. 62/674,575, filed on May 21, 2018.

(58) Field of Classification Search
USPC .......................... 119/52.1, 51.11, 51.01, 57.1
See application file for complete search history.

(56) References Cited

U.S. PATENT DOCUMENTS

| | | | |
|---|---|---|---|
| 2004/0131254 A1 | 7/2004 | Liang et al. | |
| 2006/0011145 A1 | 1/2006 | Kates | |
| 2006/0011146 A1 | 1/2006 | Kates | |
| 2006/0081644 A1* | 4/2006 | Arnold ................. | A01K 5/0291 |
| | | | 222/63 |
| 2014/0083364 A1 | 3/2014 | Anderson et al. | |
| 2014/0172460 A1 | 6/2014 | Kohli | |
| 2014/0290583 A1 | 10/2014 | Yin | |
| 2016/0015004 A1 | 1/2016 | Bonge, Jr. | |
| 2016/0295832 A1 | 10/2016 | Trottier et al. | |
| 2016/0316716 A1* | 11/2016 | Hanson ................... | A01K 5/02 |
| 2017/0039301 A1 | 2/2017 | Mainini et al. | |
| 2019/0000036 A1* | 1/2019 | Hong ....................... | A01K 5/02 |

OTHER PUBLICATIONS

ISR received in PCT/US19/33338 dated Oct. 17, 2019.
Office Action received in Chinese Patent Application No. 2019800487579 dated Jan. 11, 2022.

* cited by examiner

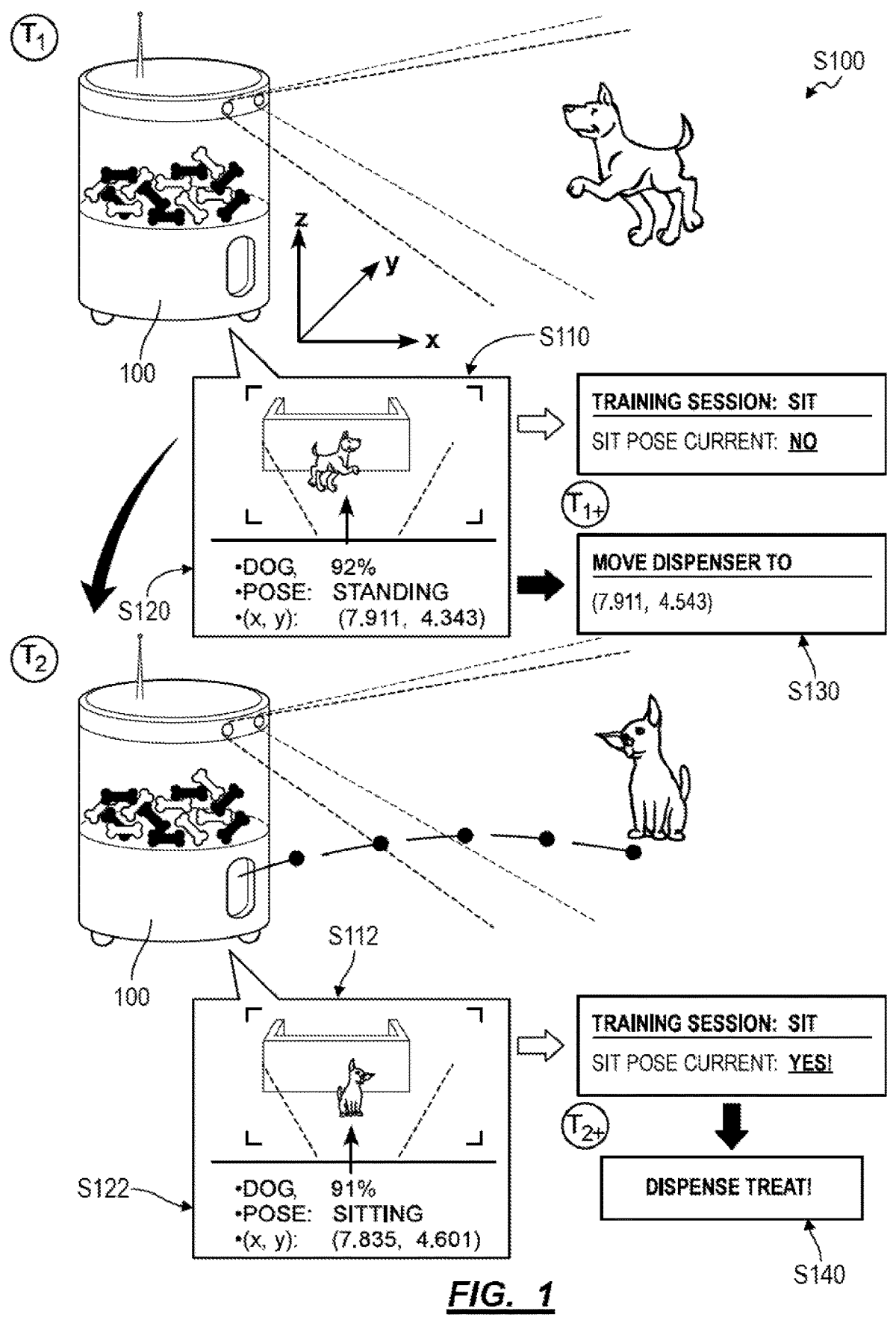

S100

S110

TRAINING SESSION: SIT

SIT POSE CURRENT: NO

•DOG,    92%
•POSE:   STANDING
•(x, y):  (7.911, 4.343)

MOVE DISPENSER TO (7.911, 4.543)

S120

S130

S112

TRAINING SESSION: SIT

SIT POSE CURRENT: YES!

•DOG,    91%
•POSE:   SITTING
•(x, y):  (7.835, 4.601)

S122

DISPENSE TREAT!

S140

100

_FIG. 1_

100

WIRELESS COMMUNICATION MODULE

SPEAKER

DEPTH CAMERA

COLOR CAMERA

PROCESSOR

WORKING FIELD

RESERVOIR

LOADER MAGAZINE

WIPER

HOUSING

DISPENSER

ORIFICE

VERTICAL POSITION ACTUATOR

DISPENSER ACTUATOR

HORIZONAL POSITION ACTUATOR

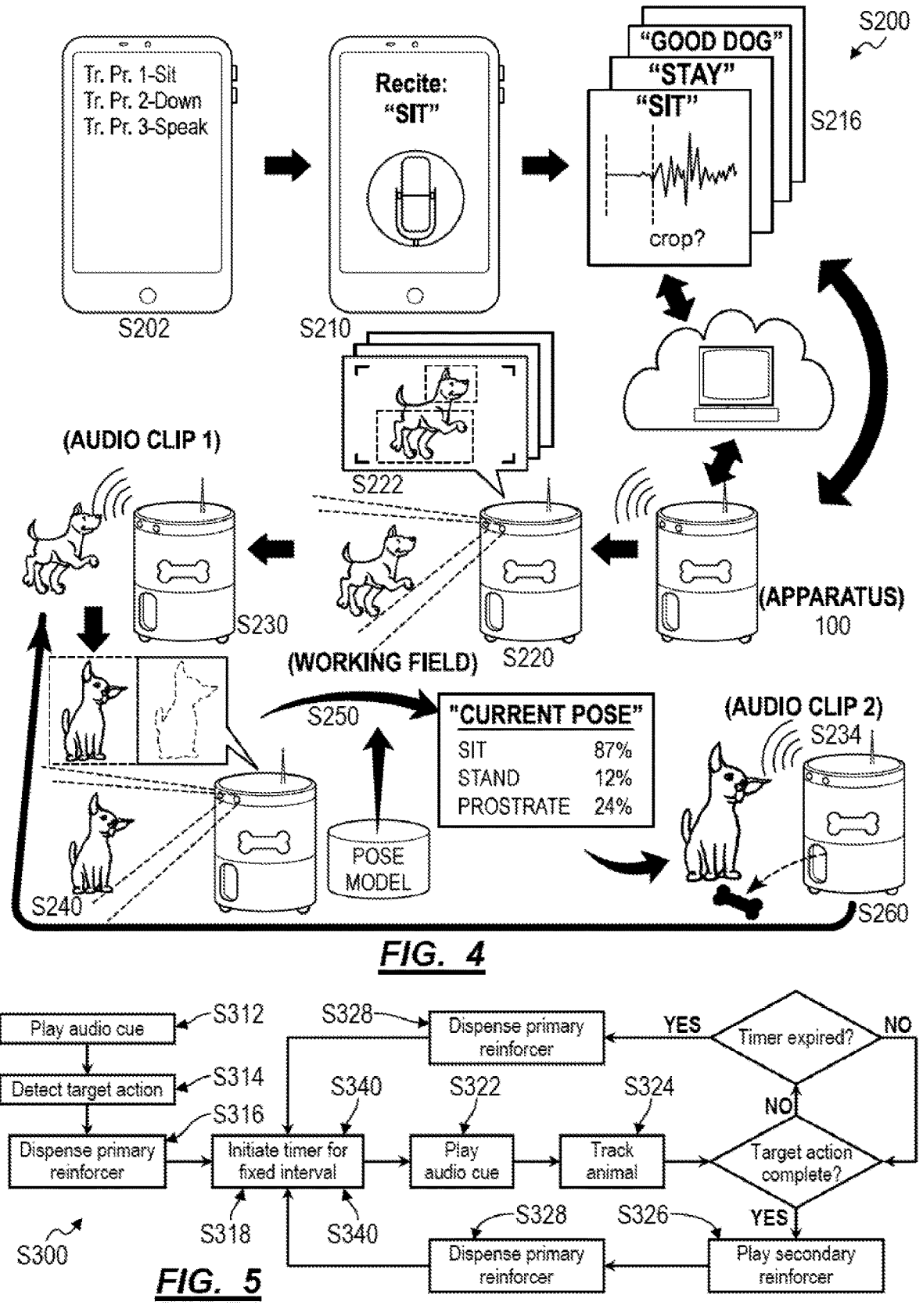
_FIG. 4_
_FIG. 5_

METHOD FOR AUTONOMOUSLY TRAINING AN ANIMAL TO RESPOND TO ORAL COMMANDS

CROSS-REFERENCE TO RELATED APPLICATIONS

This application is a continuation of U.S. patent application Ser. No. 16/418,596, filed on 21 May 2019, which claims the benefit of U.S. Provisional Application No. 62/674,575, filed on 21 May 2018, each of which is incorporated in its entirety by this reference.

TECHNICAL FIELD

This invention relates generally to the field of animal training and more specifically to a new and useful method for autonomously shaping behavior of an animal in the field of animal training.

BRIEF DESCRIPTION OF THE FIGURES

FIG. 1 is a flowchart representation of a first method;
FIG. 4 is a flowchart representation of one variation of the second method;
and
FIG. 5 is a flowchart representation of a third method.

DESCRIPTION OF THE EMBODIMENTS

Figure 2:
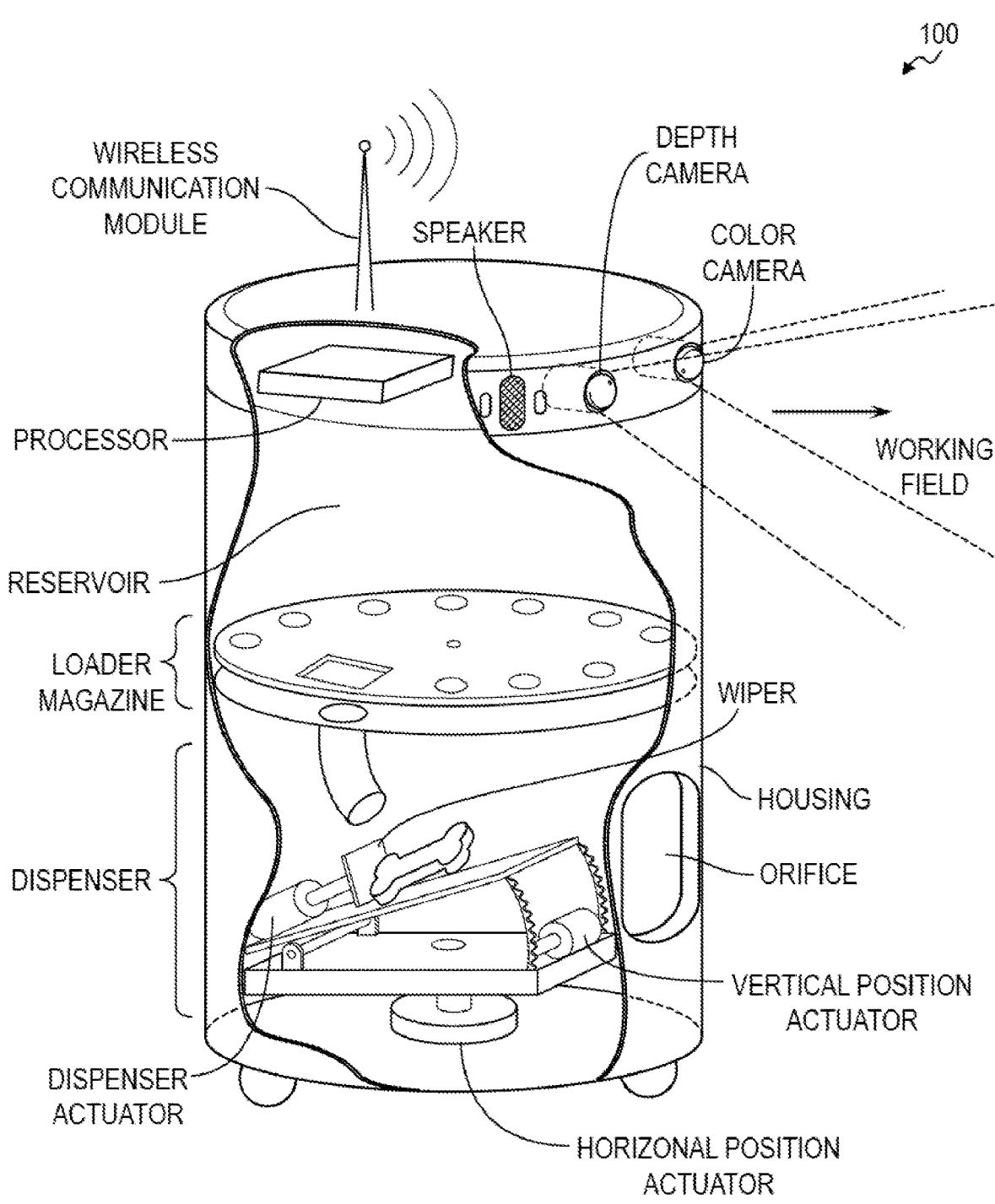
FIG. 2 is a schematic representation of a training apparatus.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. First Method—Position Tracking

As shown in FIG. 1 a first method S100 for autonomously training an animal to respond to oral commands includes: recording a first image of a working field at a first time during a training routine in Block S110; detecting a first position of the animal and a first pose of the animal in the working field in the first image in Block S120; aligning a dispenser, preloaded with a primary reinforcer, to the first position at approximately the first time in Block S130; recording a second image of the working field at a second time succeeding the first time in Block S112; detecting a second position of the animal and a second pose of the animal in the working field in the second image in Block S122; and, in response to the second pose corresponding to a target pose specified by the training routine, triggering the dispenser to eject the primary reinforcer into the working field in Block S140.

1.1 Applications

Generally, the first method S100 can be executed by an apparatus 100 to train an animal to respond to oral commands (and/or other visible or audible signals). In particular, the training apparatus 100 can include a freestanding structure containing: a primary reinforcer reservoir; a dispenser configured to eject primary reinforcers from the reservoir into a field occupied by a domesticated animal; a speaker configured to output audible cues; a suite of optical sensors facing the field; and a processor configured to implement computer vision and/or artificial intelligence techniques to interpret positions and poses of the animal within the field from images recorded by the optical sensors. During an autonomous training protocol with the animal, if the processor determines that a pose of the animal sufficiently matches a target position, that a pose of the animal sufficiently aligns with a target pose corresponding to a tone or oral command (hereinafter an "audible cue") replayed through the speaker, and/or that a pose of the animal sufficiently aligns with a path to the target position or target pose, the processor can trigger the dispenser to eject a primary reinforcer into the field, thereby positively reinforcing the animal's association between this tone or oral command and this pose.

However, the speed with which the animal may develop a positive association between this audible cue and this pose decrease as time from entry into this pose and consumption (or "assimilation") of positive reinforcement (e.g., a treat) increases. Therefore, the training apparatus 100 can locally implement computer vision and/or artificial intelligence techniques to detect the pose and position of the animal in the field ahead of the training apparatus 100 in order to minimize latency from entry of the animal into this pose and detection of the animal in this pose by the training apparatus 100. The training apparatus 100 can also maintain the dispenser in a "preloaded" state in order to minimize a time from detection of the animal in this pose and ejection of a primary reinforcer (e.g., a treat) into the field. Furthermore, the training apparatus 100 can include a horizontal position actuator configured to sweep an output of the dispenser horizontally across the field, and the training apparatus 100 can control the horizontal position actuator to maintain an axis of the dispenser in-line with the animal based on the position of the animal detected in the field such that an ejected primary reinforcer falls at or near the animal's front feet (or in or near the animal's mouth), thereby limiting a distance the animal must traverse to collect the primary reinforcer and minimizing a time from ejection of the primary reinforcer from the dispenser and consumption of the primary reinforcer by the animal.

For example, during a training protocol to teach a dog to respond to a "sit" command, the training apparatus 100 can detect the dog in the field and regularly update the position of the dispenser to align to the position of the dog in the field, such as at a rate of 30 Hz. When the training apparatus 100 detects that the dog has entered into a "sitting" pose—such as naturally early in the training protocol, when prompted with a tone in the middle of the training protocol, and when prompted via playback of a prerecorded oral "sit" command toward the end of the training protocol—the training apparatus 100 can immediately and rapidly dispense (e.g., "eject") a primary reinforcer that lands at the dog's feet, such as in less than 300 milliseconds. Because the primary reinforcer has landed at or near the dog's feet, the dog may then bend her neck down to consume the primary reinforcer without leaving the "sitting" pose (i.e., rather than stand and walk toward a primary reinforcer dispensed elsewhere in the field). The training apparatus 100 can therefore rapidly reward the dog for entering a target pose and enable the dog to consume this reinforcement within less than two seconds of entering this pose, thereby enabling the dog to rapidly develop a positive association (e.g., a "reinforcement contingency") between this pose and an audible cue.

The training apparatus 100 is described below as executing Blocks of the first method S100 to train a dog to "sit" upon command. However, the training apparatus 100 can implement similar methods and techniques to output other audible queues to an animal of any other type, to rapidly detect other poses by this animal, and to output positive reinforcement (e.g., by dispensing primary reinforcers) for the animal in order to train the animal to respond to various oral commands by performing indicated behaviors.

1.2 System

As shown in FIG. 2, the training apparatus 100 can include: a suite of optical sensors configured to record images (e.g., color and/or depth images) of a field ahead of the training apparatus 100 (hereinafter a "working field"); a speaker configured to output audible cues; a wireless communication module configured to download data and/or an animal model from a remote database or local computing device; a primary reinforcer reservoir configured to store units of a primary reinforcer, such as loose primary reinforcers or primary reinforcers in a magazine; a dispenser configured to eject primary reinforcers into the working field; a loader configured to load individual primary reinforcer units from the reservoir into the dispenser; a processor configured to interpret positions and poses of an animal in the working field in (near) real-time from images recorded by the suite of optical sensors, to confirm whether a position and/or pose of the animal matches a current command or training goal of a current training protocol, to move the dispenser into axial alignment with the animal as the animal moves through the working field, and to selectively trigger the dispenser to eject a primary reinforcer unit toward the animal accordingly; and a housing containing these elements.

1.2.1 Optical Sensors

In one implementation, the training apparatus 100 includes: a color camera configured to output 2D color images (hereinafter "color images"); and a depth camera configured to output 3D depth maps or point clouds (hereinafter "depth images"). In this implementation, the color and depth camera can be arranged in fixed positions on the housing and can define fields of view directed outwardly from the housing to define the working field in which the training apparatus 100 identifies, tracks, and selectively rewards an animal.

1.2.2 Wireless Communication Module

The wireless communication module can include a wireless transceiver configured to connect to an external device and to retrieve various data from this device. For example, the training apparatus 100 can connect to a user's smartphone or tablet—executing a native dog training application—to access: animal characteristics or descriptors input by the user; oral commands spoken by the user and recorded by the user's device; and/or training protocol preferences or selections entered by the user at the device. The wireless communication module can also download a generic animal model from a remote database. Alternatively, the wireless communication module can download a particular animal model—from a set of available animal models—more tailored to detecting and identifying a particular animal designated for training by the training apparatus 100, such as based on a species, breed, age, size, or markings of the animal input by the user into the native dog application executing on her smartphone or tablet.

Furthermore, the wireless communication module can upload color and/or depth images recorded by the training apparatus 100 to a remote server in order to expand a training set of images of animals available to the remote server; the remote server can then retrain an animal model based on these additional data and redeploy the animal model to the training apparatus 100 (and to other instances of the training apparatus 100) to improve detection of an animal and identification of poses of the animal.

1.2.3 Reservoir and Loader

The primary reinforcer reservoir is configured to store many primary reinforcer units. For example, the reservoir can include a container configured to store loose primary reinforcers, a removable locking lid, and an outlet port that releases primary reinforcer units into the loader. The loader is configured to sequentially move individual primary reinforcer units out of the reservoir and into the dispenser. In one implementation, the loader includes an auger extending into the output port of the reservoir, terminating over the dispenser, and powered by a loader actuator that rotates the auger to transfer individual primary reinforcer units from the reservoir into the dispenser.

In another implementation, the loader includes a magazine arranged inside the reservoir, configured to rotate inside the reservoir when powered by a loader actuator, and defining one or more primary reinforcer slots configured to sequentially align with the outlet port in the reservoir. In this implementation, each primary reinforcer slot can be sized to accept one primary reinforcer unit, and the reservoir can include a guard arranged inside the reservoir over the outlet port and offset from the outlet port by a distance sufficient for the magazine to pass between the guard and the outlet port. To dispense a primary reinforcer unit, the loader actuator (e.g., a rotary electric motor) can index the magazine forward by an angular distance between adjacent primary reinforcer slots in the magazine, thereby aligning a next primary reinforcer slot—currently loaded with a primary reinforcer unit—with the outlet port in the reservoir, which releases this primary reinforcer unit from this primary reinforcer slot toward the dispenser while the guard prevents additional primary reinforcer units from flowing down into this primary reinforcer slot and through the outlet port in the reservoir.

(The loader can also include an optical detector or other sensor arranged across the outlet port in the retainer plate and configured to output a signal indicating that a primary reinforcer unit has passed through the outlet port and into the dispenser below.)

1.2.4 Dispenser

The dispenser is configured to eject a primary reinforcer unit into the field, such as to a target lateral and depth position in the working field to land at an animal's feet or along a target trajectory to land at or near the animal's mouth.

In one implementation, the dispenser includes: a chamber arranged below the outlet of the loader (e.g., at the output end of the auger-type loader or below the outlet port of the reservoir) and configured to receive individual primary reinforcer units from the loader; an orifice or barrel extending from the chamber and facing the working field; a wiper (or a pin) configured to advance and retract behind the chamber; and a dispenser actuator configured to rapidly advance the wiper (or the pin) forward toward the chamber to drive an individual primary reinforcer unit through the orifice and into the working field. For example, the actuator can include a solenoid configured to drive the wiper (or the pin) forward when triggered by the processor. In another example, the wiper (or the pin) is spring loaded; and the dispenser includes a linear or rotary actuator configured to retract the wiper (or pin) and a second actuator configured to release the wiper (or the pin) to drive the wiper forward and thus project an individual primary reinforcer unit from the dispenser.

The dispenser (and loader and/or reservoir) can also be mounted on a gimbal configured to pivot (approximately) in the horizontal plane; and the training apparatus 100 can include a horizontal position actuator (e.g., a rotary electric motor) configured to rotate the gimbal in order to sweep the orifice of the dispenser through a range of angular positions—in the horizontal plane—across the working plane, such as to maintain the axis of the dispenser in alignment with an animal detected in the working field. The dispenser can also include an angular position sensor (e.g., an optical encoder, a potentiometer) configured to output an angular position of the gimbal relative to the housing.

However, the training apparatus 100 can include any other mechanisms configured to rapidly eject individual primary reinforcer units into the working field when triggered by the processor and configured to sweep an axis of the dispenser horizontally across the working field.

1.2.5 Vertical Position Adjustment

In one variation, the dispenser is mounted to a second gimbal configured to pivot in the vertical plane; and the training apparatus 100 can include a vertical position actuator configured to pivot the second gimbal to adjust an angular position of the dispenser in the vertical plane. In this variation, the training apparatus 100 can track the position of the dog's mouth in the 3D working field and adjust both the horizontal position actuator and the vertical orientation sensor such that a primary reinforcer unit ejected by the dispenser follows a trajectory that intersects the mouth of an animal in the working field, thereby further reducing a time from the training apparatus 100 detecting the animal entering a target pose and consumption of a reinforcement by the animal.

1.2.6 Speaker

As described above, the speaker is configured to output audible command cues in order to elicit a behavior or pose by an animal in the working field. The speaker can also output audible reinforcer cues (e.g., an audible tone) between detection of the animal performing the cued behavior or pose and ejection of a physical reinforcer (e.g., a "treat") to the animal by the training apparatus 100 in order to bridge a temporal gap between proper response to the audible command cue by the animal and the dispensation of the physical reinforcer to the animal. Over time, the animal may thus associate this audible reinforcer tone with positive reinforcement, which may later permit the training apparatus 100 to output the audible reinforcer tone rather than the physical reinforcer, such as if a primary reinforcer limit for the animal has been reached during a current session.

1.2.7 Variations

In one variation, the training apparatus 100 also includes a visual display—such as an LED array—configured to output visual cues to the animal. In this variation, the system can implement methods and techniques similar to those described below to output a visual queue corresponding to a particular command and target response and to selectively dispense reinforcement to an animal (e.g., in the form of a treat) when the training apparatus 100 detects that the animal has completed the target response.

The training apparatus 100 can additionally or alternatively include an acoustic sensor (e.g., a microphone) configured to detect audible signals in the working field. For example, the training apparatus 100 can implement methods and techniques similar to those described herein to shape sound-related behaviors in an animal, such as responses to "speak" and "quiet" commands.

1.3 Initialization and Dog Profile

The training apparatus 100 can interface with a native application or web application—executing on a user's computing device—to configure a series of training protocols for a new animal. For example, once the training apparatus 100 is received by the user, the user can download the native application to her smartphone and connect her smartphone to the training apparatus 100, such as by: wirelessly pairing her smartphone to the training apparatus 100; scanning a QR code arranged on the training apparatus 100 to register the training apparatus 100 to her smartphone; or by manually entering into the native application a unique code arranged on the training apparatus 100 or product packaging.

Once the training apparatus 100 is registered and connected to the user's smartphone, the user can create a new profile for her dog within the native application and manually populate the new profile with various information, such as: a name; age; breed; size; and/or primary colors of the dog's coat (e.g., black for a black Labrador or reddish-brown for a redbone coonhound). This new profile can be stored in a remote database, and the native application can upload these data to the new profile via the Internet.

1.3.1 Oral Commands

Once a new profile is thus created for the user's dog, the native application can prompt the user to recite various oral commands for the dog and record these oral commands. For example, the native application can prompt the user to orally recite her preferred forms of various oral commands including: "watch me"; "sit"; "down"; "stand"; "stay"; "heel"; "wait"; "come"; "drop it"; and/or "crate"; etc. During this setup process, the native application can: record a discrete soundbite as the user recites each of these oral commands and a name of her dog; and tag each of these soundbites with a tag for the corresponding command or pet name. The native application can then upload these tagged soundbites to the training apparatus 100 (e.g., directly via a local ad hoc wireless network).

1.3.2 Visual Animal Characteristics

In one variation, the native application also collects information related to visual characteristics of the user's dog. The training apparatus 100 can then leverage these data to select or tune an animal model to reduce a speed and increase an accuracy with which the training apparatus 100 implements the animal model to detect presence, locations, and poses of the user's dog in the working field, thereby reducing latency and false positive training events and enabling the dog to make more accurate associations between commands and poses even more quickly.

In one implementation, the native application prompts the user to record an image of her dog or to select an existing image of her dog stored on her smartphone. Alternatively, the native application can prompt the user to place her dog in front of the training apparatus 100 and then trigger the training apparatus 100 to record an image of the dog. Once an existing image of the dog is selected by the user or once a new image of the dog is recorded at the smartphone or system, the native application can render the image on a screen of the smartphone and prompt the user to manually indicate the dog in the image, such as by manually drawing a box, drawing a perimeter, or otherwise manually highlighting the dog in the image. Alternatively, the native application can: implement computer vision techniques to detect a dog in the image (or to detect pixels in the image likely to represent a "dog" or an "animal" more generally); render the image on a display of the user's smartphone; highlight a contiguous cluster of pixels likely to represent a dog or an animal more generally; and then prompt the user to confirm that these pixels represent the user's dog or to adjust this highlighted area to better encompass the dog shown in this image. For example, the native application can implement a generic animal model—similar or identical to an animal model implemented by the training apparatus 100—to predict a location of a dog in the image, prompt the user to confirm that the native application's prediction is correct or to manually modify this prediction, and then return the image and these feedback to a remote computer system, which can then retrain the generic animal model or train a custom animal model for the user's dog based on these feedback provided by the user.

In another example, the native application (or a remote computer system) can: extract visual characteristics of the dog from the image selected by the user, such as by extracting frequencies (e.g., rates of recurrence, a histogram) of colors present in a region of the image confirmed by the user as representing the dog; and then write to the dog's profile up to three distinct, highest-frequency colors extracted from this region of the image. The training apparatus 100 (or the remote computer system) can then tune an animal model to detect the dog in a color image—recorded by the color camera during a subsequent training protocol—based on these highest-frequency colors more representative of the dog's coat.

The native application (or the remote computer system) can also estimate a size of the dog from the image selected by the user or otherwise prompt the user to indicate a size of the dog, such as in length or height dimensions or in weight, and then store this size value in the dog's profile. The training apparatus 100 (or the remote computer system) can then tune an animal model to detect the dog in a depth image—recorded by the depth camera during a subsequent training protocol—based on a size of the dog.

Similarly, the native application (or the remote computer system) can implement computer system techniques to extract geometries of the dog from the image selected by the user or otherwise prompt the user to enter additional characteristics of her dog, such as whether the dog has: short or long legs; a short or long torso; a round or tapered torso; a tail or no tail; a short or long nose; a short or long coat; natural or cropped ears; and/or a small or large ratio of height to length; etc. The training apparatus 100 (or the remote computer system) can then tune an animal model to detect the dog in color and/or depth images—recorded by the suite of optical sensors during a subsequent training protocol—based on a combination of such characteristics of the dog.

(Alternatively, the training apparatus 100 can implement any of the foregoing processes locally to initialize a new profile for the user's dog, to aggregate soundbites of the user reciting various commands, and to aggregate features or characteristics of the dog, etc. via a user interface integrated in the training apparatus 100.)

1.4 Animal Model

In one variation, prior to a first training protocol with the dog (e.g., a first "introduction protocol"), the training apparatus 100 can: query a remote database for a dog presence and pose detection model trained on images of dogs of an age, breed, size, shape, and/or coat length, etc. that are the same or similar to characteristics stored in the dog's profile; and then download this animal model from the remote database, such as over the internet or via the user's smartphone or tablet. Similarly, the native application, the training apparatus 100, and/or the remote computer system can: tune a generic animal model based on various characteristics stored in the dog profile; or select one animal model—from a corpus of existing animal models—developed to detect presence and pose of dogs exhibiting various characteristics similar to those of the dog. The training apparatus 100 can then implement a local copy of this animal model to rapidly detect presence (i.e., location and orientation) and pose of the dog in images recorded by the training apparatus 100 during a subsequent training protocol with the dog. By accessing an animal model "tuned" to detecting presence and pose of animals exhibiting characteristics similar to those aggregated into the dog's profile during setup, the training apparatus 100 may detect the presence and orientation of the dog in the working field more quickly and with increased confidence.

Alternatively, the training apparatus 100 can implement a generic animal model to detect the presence and orientation of the dog in the working field, such as if limited information about the dog is provided by the user during setup.

1.5 Tracking Dog Position and Dispenser Position Update

During a training protocol, the training apparatus 100 can regularly: record color and/or depth images of the working field; implement the animal model to detect a position and pose of the dog; and regularly update the position of the horizontal position actuator (and the vertical position actuator) to align the dispenser to the dog (e.g., to the center of the dog's front feet or to the dog's mouth) in real-time, such as at a rate of 30 Hz. In particular, by regularly recording and scanning images of the working field for the dog, the training apparatus 100 can rapidly determine whether the dog has entered a target position specified in the current training protocol and thus minimize a time to detect that the dog has responded to a command. Furthermore, by tracking the dog in the working field and updating positions of various actuators in the training apparatus 100 in real-time to align the output of the dispenser to the dog, the training apparatus 100 can immediately eject a primary reinforcer unit directly at the dog's feet and thus minimize a time from detecting that the dog has responded to a command to consumption of a reinforcement by the dog.

In one implementation, the training apparatus 100 records a baseline depth image and a baseline color image of the working field, such as in response to confirmation from the user—at the native application—that no animal is in the working field. (Alternatively, the training apparatus 100 can develop a baseline depth image and a baseline color image based on features that remain unchanged over sequences of depth and color images recorded by the training apparatus 100 over time.)

During a training protocol, the training apparatus 100 can: record a color image and a concurrent depth image; compare the color image to the baseline color image to isolate a change in the working field represented in this color image; a region of the color image that differs from the baseline color image to the animal model stored locally on the training apparatus 100 to interpret this region as either representing a dog or not representing a dog (or a probability that pixels in this region of the color image represent a dog). With this same animal model or with a separate pose model stored on the training apparatus 100, the training apparatus 100 can also interpret a pose of the dog depicted in this region of the color image. The training apparatus 100 can then: isolate a region of the depth image corresponding to the region in the color image identified as the dog; and then extract a longitudinal distance and a lateral distance of the dog—from the depth camera or from another reference origin on the training apparatus 100—from this region of the depth image. The training apparatus 100 can then: transform this longitudinal distance and lateral distance into an angular position of the dispenser in the horizontal plane; and drive the horizontal position actuator to this angular position. The training apparatus 100 can also: transform this longitudinal distance and lateral distance into a target distance from the training apparatus 100 to the dog along the ground plane; and adjust a speed of the dispenser and/or a position of the vertical position actuator to prepare the training apparatus 100 to eject a next primary reinforcer unit to this target distance.

In one variation, the training apparatus 100 can additionally or alternatively: detect the dog's head or mouth in the color image; isolate the dog's head or mouth in the concurrent depth image based on a known offset between the color camera and the depth camera; detect or fit a ground plane in the concurrent depth image; and extract a longitudinal distance, a lateral distance, and a height of the dog's head or mouth in the working field relative to a reference origin defined by the training apparatus 100. The training apparatus 100 can then: transform this longitudinal distance and lateral distance into an angular position of the dispenser in the horizontal plane; drive the horizontal position actuator to this angular position; transform the longitudinal distance and lateral distance into a minimum distance from the training apparatus 100 to the dog along the ground plane; transform the minimum distance along the ground plane and the height of the dog's head or mouth into a target primary reinforcer trajectory; and then adjust a setting or function within the dispenser and/or drive the vertical position actuator in the dispenser to a corresponding angular position to prepare the training apparatus 100 to eject a next primary reinforcer unit along this trajectory.

The training apparatus 100 can repeat the foregoing methods and techniques to record a next set of depth and color images, to detect the dog in the working field, and to drive actuators within the training apparatus 100 to align the dispenser to the dog (or to the dog's head or mouth, more specifically), such as at a rate of 30 Hz. However, the training apparatus 100 can implement any other method or technique to detect a dog in the field ahead of the sensor and at any other rate; the training apparatus 100 can also implement any other controls to update the position of the dispenser to align the trajectory of a primary reinforcer ejected from the dispenser to the dog detected in the field.

1.6 Primary Reinforcer Dispense Routine

Upon detecting that the dog has entered or passed through a target pose specified in a current training protocol, the training apparatus 100 can immediately execute a dispense routine to trigger the dispenser to eject a primary reinforcer unit into the working field. In particular, because the training apparatus 100 maintains the dispenser in alignment with the dog during a training routine, the dispenser can rapidly eject a primary reinforcer that may land immediately at the dog's feet once triggered. Rather than train the dog to complete a commanded action, walk toward a dispensed primary reinforcer, and only then consume a reinforcement for performing this action—which may reinforce the dog leaving its current pose (e.g., sitting, laying down) after completing an action to collect its reinforcement and which may thus obfuscate the dog's association between the command and a particular action or pose—the training apparatus 100 can instead reward the dog for completing the action exclusively by dispensing a primary reinforcer at the dog's feet (or directly into the dog's mouth) and thus enable the dog to develop a clear positive association between the action, the command, and the reinforcement.

In one implementation, the training apparatus 100 maintains the dispenser in a loaded and armed state. During a dispense routine, the training apparatus 100 triggers the dispense actuator to immediately eject a primary reinforcer into the working field. Once the dispenser thus ejects a primary reinforcer, the training apparatus 100 can immediately reset the dispenser actuator and trigger the loader actuator to load a next primary reinforcer unit into the dispenser.

Because the training apparatus 100 immediately reloads the dispenser after dispensing a primary reinforcer toward the dog, the dog may consume the primary reinforcer while the training apparatus 100 reloads the dispenser. Internal mechanical elements and/or primary reinforcers within the training apparatus 100 may move during this reload segment of the dispense routine, which may cause the training apparatus 100 to produce an audible (e.g., substantially repeatable) noise. Because this noise is made by the training apparatus 100 while the dog consumes the dispensed primary reinforcer, the dog may further associate this noise with consumption of a reinforcement. The training apparatus 100 can leverage the dog's association between this "reload noise" and a reinforcement to call the dog's attention to the training apparatus 100 before beginning a later training routine with the dog. (During a reload procedure, the training apparatus 100 can also oscillate the loader actuator in order to jostle primary reinforcers in the reservoir, which may both: prevent jams in the loader; and increase the amplitude and duration of noise created by the training apparatus 100 during the reload procedure, which may further reinforce the dog's association of this reload noise to a reinforcement.)

At the conclusion of a dispense routine, the dispenser can therefore be reloaded with a primary reinforcer and armed to rapidly dispense this primary reinforcer into the working field upon completion of a next command by the dog (or upon continuation of the same pose by the dog over some time interval).

1.7 Initial Training Protocol

During a first training protocol to teach the dog a new command (e.g., to "sit" on command): the user can place the dog in front of or near system; the user can place the training apparatus 100 in a confinement area occupied by the dog; or the training apparatus 100 can call the dog to the training apparatus 100, such as by jostling primary reinforcers stored in the reservoir or outputting an audible cue through the speaker.

The training apparatus 100 then implements methods and techniques described above to track the dog in the working field. While tracking the dog, the training apparatus 100 dispenses primary reinforcers throughout the working field, such as (pseudo)randomly throughout the working field as the dog builds an association between the training apparatus 100 and positive reward (i.e., primary reinforcers).

Over time, the training apparatus 100 can reduce a frequency with which it ejects primary reinforcers to (pseudo) random locations throughout the working field; however, the dog may intentionally linger near the training apparatus 100 while awaiting additional primary reinforcers dispensed by the training apparatus 100. During this period, the training apparatus 100 can continue to: monitor the position, orientation, and pose of the dog, as described above; and update the position of the dispenser to maintain alignment with the dog. If the training apparatus 100 detects that the dog has transitioned into (or through) a "sit" pose, such as with a very high degree of confidence, the training apparatus 100 can immediately: execute a dispense routine to eject a primary reinforcer toward the dog's feet; and output an audible tone, such as within 250 milliseconds of the dog entering (or passing through) the "sit" pose. In particular, because the training apparatus 100 has preloaded a primary reinforcer into the dispenser and maintained alignment of the dispenser to the dog (or to the dog's mouth) even as the dog has moved throughout the working field, the training apparatus 100 can immediately execute a dispense routine to eject a primary reinforcer at the dog's front feet (and eventually directly into the dog's mouth), thereby reducing latency between the dog's action and positive reinforcement for this action, which may exponentially increase the speed and strength of an association that the dog makes between this pose and this positive reinforcement.

In this implementation, the training apparatus 100 can continue to execute dispense routines and output the audible tone while the dog remains in the "sit" pose, such as once per two-second interval for up to five intervals in order to reinforce an association between positive reinforcement, this audible tone, and this pose. To prompt the dog to move into another location in the field, the training apparatus 100 can move actuators within the training apparatus 100 to align the dispenser to another location in the field and then execute another dispense routine to eject a primary reinforcer, which the dog may walk toward. The training apparatus 100 can then repeat the foregoing process to rapidly eject a primary reinforcer toward the dog and to output an audible tone (e.g., again within 250 milliseconds) after detecting the dog once again entering into (or passing through) the "sit" pose. The training apparatus 100 can repeat this process over time— such as over a period of ten minutes—to reinforce an association between the "sit" pose, positive reinforcement (e.g., treats), and the audible tone.

While continuing to track the dog, the training apparatus 100 can then transition into: outputting the audible tone; maintaining alignment between the dispenser and the dog in the field; and then triggering a dispense routine to rapidly eject a primary reinforcer into the field when the dog transitions into the "sit" pose following output of the audible tone.

Furthermore, as the dog increases a frequency and speed of entering the "sit" pose following output of the audible tone by the training apparatus 100, the training apparatus 100 can transition into outputting a prerecorded oral command—spoken by the dog's owner, as described above—for the "sit" command, such as by replaying a "sit" soundbite before, during, or after outputting the audible tone. The training apparatus 100 can continue to track the dog in the working field, maintain alignment between the dispenser and the dog in the field; and trigger a dispense routine to rapidly eject a primary reinforcer into the field when the dog transitions into the "sit" pose following output of the audible tone and the "sit" soundbite.

Throughout the remainder of this training protocol, the training apparatus 100 can reduce the amplitude of the audible tone while maintaining or increasing the amplitude of the "sit" soundbite replayed through the speaker in order to build an association between: the oral command to "sit" spoken by the dog's owner and the "sit" pose.

During this "sit" training protocol, the training apparatus 100 can thus: track the dog's position and pose within the field; intelligently and rapidly dispense a primary reinforcer directly at the dog's feet (and eventually directly into the dog's mouth) when the training apparatus 100 detects that the dog has entered a desired pose, then when the dog has entered this pose responsive to an audible tone, and finally when the dog has entered this pose responsive to playback of a prerecorded oral command associated with this pose. By tracking the dog's position and pose in real-time, maintaining the dispenser in an armed state and in alignment with the dog, and rapidly executing dispense routines when the dog has entered the desired pose, the training apparatus 100 can thus limit latency and enable the dog to rapidly develop an association between the prerecorded oral command, the desired pose, and positive reinforcement.

The training apparatus 100 can implement similar methods and techniques to train the dog to respond to other prerecorded oral commands, such as "down," "stand," "stay," and/or "crate," etc.

1.8 Closed-Loop Primary Reinforcer Trajectory Control

In one variation, the training apparatus 100: tracks the pose and position of the dog after dispensing a primary reinforcer; estimates an actual location in the field at which the primary reinforcer landed or the trajectory of the primary reinforcer into the working field based on a change in the position and/or pose of the dog immediately following this dispense routine; and modifies calibration values of the dispenser actuator, the horizontal position actuator, and/or the vertical position actuator to compensate for a difference between the actual location and target location for the primary reinforcer dispensed into the field.

Generally, the dog may be likely to walk toward a primary reinforcer resting or moving along the ground plane and to bend to collect the primary reinforcer with his mouth contacting or coming near the ground plane. Therefore, the training apparatus 100 can: detect and track the dog's mouth (or nose, snout, or head) in color and/or depth images recorded by the training apparatus 100 after ejecting a primary reinforcer into the field; detect and track a ground plane in these images; detect intersection of the dog's nose with the ground plane in these images; estimate the actual location of this intersection with the location at which the primary reinforcer unit landed in the working field; and then calculate a difference between a target location calculated for this primary reinforcer just before executing the dispense routine and the actual location at which primary reinforcer unit landed. Then, if the actual location at which the primary reinforcer landed is further from the training apparatus 100 than the target location for the primary reinforcer, the training apparatus 100 can recalibrate the dispenser to decrease an ejection speed of the dispenser; and vice versa. Similarly, if the actual location at which the primary reinforcer landed falls to the right of the target location, the training apparatus 100 can shift a calibration position of the horizontal position actuator to the left to compensate for this difference; and vice versa.

In the variation described above in which the training apparatus 100 includes a mechanism to orient the dispenser in the vertical plane and to project a primary reinforcer directly toward the dog's mouth, the dog may catch a primary reinforcer—ejected by the training apparatus 100— in mid-air. Therefore, in this variation, the training apparatus 100 can also track the pose of the dog in color and/or depth images recorded just after the primary reinforcer is dispensed and estimate the trajectory of this primary reinforcer based on a change in the pose of the dog. For example, if system detects—in a series of images recorded just after the dispense routine—that the dog jumped straight up when the primary reinforcer was dispensed, the training apparatus 100 can estimate that the primary reinforcer landed in-line with the dog but too high; the training apparatus 100 can then recalibrate the dispenser actuator to decrease the ejection speed of primary reinforcers and/or modify a calibration angle of the vertical position actuator to compensate. Similarly, if the system detects—in a series of images recorded just after the dispense routine—that the dog jumped forward when the primary reinforcer was dispensed, the training apparatus 100 can estimate that the primary reinforcer landed in-line with the dog but too low; the training apparatus 100 can then recalibrate the dispenser actuator to increase the ejection speed of primary reinforcers or modify a calibration angle of the vertical position actuator to compensate.

In another implementation, as the training apparatus 100 collects pairs of dispenser positions and primary reinforcer trajectories—derived from changes in poses and positions of the dog in the field—over time, the training apparatus 100 can then compile these data in a 2D trajectory map that links the position of the dispenser in the horizontal plane and/or the speed of the dispenser actuator to a position on the ground plane ahead of the training apparatus 100 at which a primary reinforcer will land. Throughout a training routine, the training apparatus 100 can thus: record a color image and/or depth image of the working field; extract the position and orientation of the dog at the ground plane from the color image and/or depth image, as described above; define a target 2D location—to dispense a primary reinforcer unit on the ground plane—at the front feet of the dog; reference the 2D trajectory map to transform this target 2D location into a target position of the dispenser in the horizontal plane and/or a target speed of the dispenser actuator, such as by interpolating between points in the 2D trajectory map; and then drive the horizontal position actuator to this target horizontal position. The training apparatus 100 can regularly execute this process, such as at a rate of 30 Hz. When the training apparatus 100 then determines that the dog has properly responded to the current command based on a position and orientation of the dog in a later color image and/or depth image, the training apparatus 100 can immediately trigger the dispenser actuator at the last calculated target speed, thereby dispensing a primary reinforcer unit at or near the dog's feet.

During an introduction protocol in which the dog is first introduced to the training apparatus 100, the training apparatus 100 can implement these methods to (pseudo)randomly dispense primary reinforcers throughout the field, to estimate trajectories of these primary reinforcers based on locations at which the dog's nose intersects the ground plane, and to construct this 2D trajectory map according to these estimated primary reinforcer trajectories while simultaneously teaching the dog that the training apparatus 100 dispenses primary reinforcers (i.e., acclimating the dog to dispensation of positive reinforcement by the training apparatus 100).

The training apparatus 100 can then transition into implementing this 2D trajectory map to dispense primary reinforcers to target locations on the ground plane during later training protocols; and the training apparatus 100 can continue to update the 2D trajectory map based on further interactions with the dog over time.

Similarly, the training apparatus 100 can compile pairs of dispenser positions and primary reinforcer trajectories collected over time into a 3D calibration map that links the position of the dispenser in the horizontal plane, the position of the dispenser in the vertical plane, and/or the speed of the dispenser actuator to 3D trajectories of primary reinforcers dispensed from the training apparatus 100. In this variation, the training apparatus 100 can: record a color image and/or depth image of the working field; extract the 3D position and orientation of the dog's mouth in the working field from the color image and/or depth image; define a target 3D location—to dispense a primary reinforcer unit—into the dog's mouth; reference the 3D trajectory map to transform this target 3D location into a target position of the dispenser in the horizontal and vertical planes and/or a target speed of the dispenser actuator, such as by interpolating between trajectories represented in the 3D trajectory map; and then drive the horizontal and vertical position actuators to these target horizontal and vertical positions. The training apparatus 100 can regularly execute this process, such as at a rate of 30 Hz. When the training apparatus 100 then determines that the dog has properly responded to the current command based on a position and orientation of the dog in a later color image and/or depth image, the training apparatus 100 can immediately trigger the dispenser actuator at the last calculated target speed, thereby dispensing a primary reinforcer toward the dog's mouth.

2. Second Method—Voice Command

Figure 3:
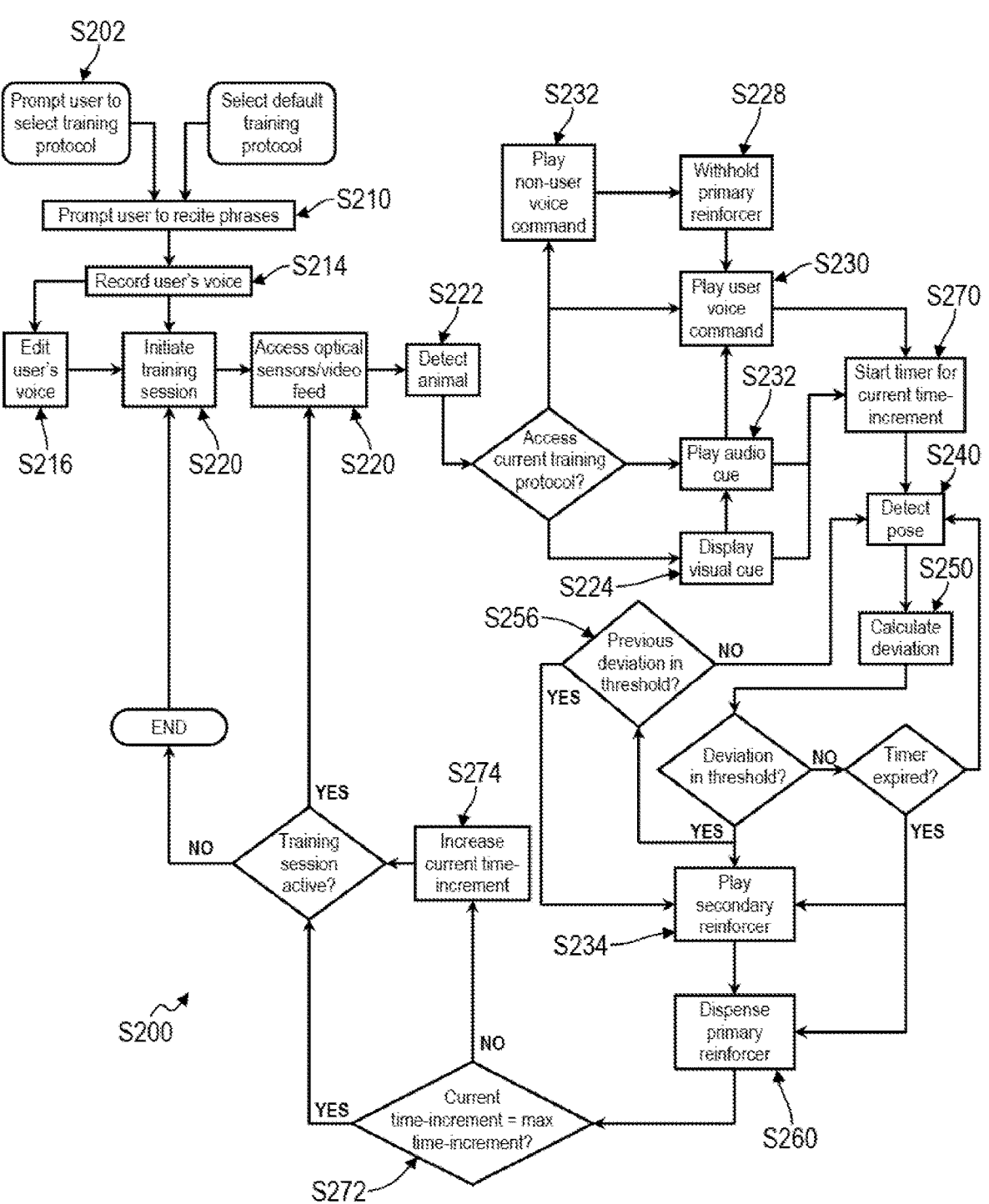
FIG. 3 is a flowchart representation of a second method.

As shown in FIGS. 3 and 4, a second method S200 for autonomously training an animal to respond to oral commands includes: prompting a user to select a training protocol from a set of training protocols in Block S202; prompting the user to record a first audio clip of the user reciting a voice command associated with a target pose within the training protocol, the user affiliated with the animal in Block S210; accessing a video feed recorded by an optical sensor during a first training session, the optical sensor integrated into the training apparatus and defining a field of view intersecting a working field in Block S220; in the video feed, detecting the animal within the working field in Block S222; while the animal is detected in the working field, playing back the first audio clip via an audio driver integrated into the training apparatus in Block S230; in the video feed, detecting a current pose of the animal in Block S240; calculating a deviation between the current pose of the animal and the target pose in Block S250; in response to the deviation falling within a threshold, playing a second audio clip comprising a secondary reinforcer in Block S234; and dispensing a first unit of a primary reinforcer via a dispenser integrated into the training apparatus in Block S260.

2.1 Applications

Generally, like the first method S100, the second method S200 can be executed by the training apparatus 100 in cooperation with a native application executing on a user's mobile device (altogether hereinafter "the system"): to record a user speaking a command; and to autonomously train an animal (e.g., a dog) to consistently perform a behavior or enter a pose associated with this voice command without the user present.

In particular, the native application can execute Blocks of the second method S200 to prompt the user to record voice commands and secondary reinforcers related to a suite of training protocols. For example, the native application prompts the user to recite the word "sit" as a voice command in relation to a sit training protocol for a dog. The native application crops the recording to remove extraneous silence in the recording and wirelessly transmits the recording to the training apparatus. The training apparatus can then execute other Blocks of the second method S200 to replay these recordings of the user's voice during training sessions with the dog in order to train the dog to enter poses or perform behaviors associated with these recordings.

The training apparatus executing the second method S200 enables the user to autonomously train a domesticated animal with her own voice while she is engaging in other activities, or even completely absent from her home. If an animal is left alone for an extended period during the day or night, the training apparatus engages with the animal periodically, which engages the animal while the user is away. By using the user's own voice during the training sessions, the animal begins to associate the user's voice as a secondary reinforcer tied to the primary reinforcer (e.g., a treat), which enables the user to reinforce the dog's behavior even without the primary reinforcer. Additionally, the consistency of the method S200 trains the animal in less time than traditional means.

2.2 Example

In one implementation, once the training apparatus is located in a primary training area (e.g., a living room of an apartment, a backyard), the training apparatus accesses color images and/or depth maps recorded by integrated optical sensors to define and monitor a working field nearby. At the start of a training session, the training apparatus: loads a training protocol for a sit command; displays a visual cue to indicate to the animal that a training session has begun; dispenses a primary reinforcer (e.g., a treat)—via the integrated primary reinforcer dispenser—into the working field in order to draw the animal toward the training apparatus; and continues to dispense the primary reinforcer to reward the dog for remaining in the working field. The training apparatus can then track the dog in the working field via depth maps and/or color images recorded by the optical sensors and selectively dispense additional units of the primary reinforcers when the training apparatus detects the dog in the sit pose, and simultaneously plays back the audio clip of the user reciting the voice command "sit" using the integrated speakers. The training apparatus then uses machine learning techniques to identify postures indicating the animal is about to enter into a sit pose, plays back the voice command before the animal fully enters the final pose, and dispenses a primary reinforcer to the animal after the animal fully completes the target pose.

After an initial acclimation period, the training apparatus plays back the user's "sit" voice command using the speakers while the animal is not in the sit pose, and if the dog engages in the desired behavior within a set time-increment after the playback of the voice command, the dispenser dispenses a primary reinforcer to the dog and the speaker plays back a secondary reinforcer, e.g. "good dog" recorded in the user's voice. The training sessions continue periodically until the animal consistently performs the behavior in response to the user's voice command with a minimum latency, at which point the training apparatus begins the next training session using a different training protocol, e.g. "lay down." As the animal progresses through the suite of training protocols, the training apparatus performs maintenance training sessions of training protocols that the animal already mastered to ensure that the animal maintains a baseline level of mastery, as well as to keep the animal engaged and interested.

In some instances, certain animals may become disinterested in the training apparatus prior to reaching a level of positive association required to fully execute the method. The training apparatus runs simultaneous reinforcement schedules (the standard behavior-based reinforcement schedule and a time-increment reinforcement schedule) in these instances to keep the animal engaged. In particular, the training apparatus outputs the voice command and starts a timer. If the dog does not perform the target pose within a first time-increment, e.g. 30 seconds, the training apparatus dispenses a primary reinforcer to the dog, replays the target voice command, and restarts the timer for a second increment, e.g. 60 seconds. The training apparatus continues to increase the time-increment up to a maximum time-increment, e.g. 120 seconds, such that the animal will not wait longer than 120 seconds without receiving a primary reinforcer for the duration of the training session. If, during any of these time-increments, the animal performs the target behavior, the training apparatus dispenses a primary reinforcer, and restarts the timer to the current time-increment.

2.3 Voice Training

The system can execute blocks of second method S200 to train an animal to respond to a user's voice.

2.3.1 Selecting Training Protocol

Block S202 of the second method S200 recites: prompting a user to select a training protocol from a set of training protocols. Generally, in Block S202, the mobile device or native application interfaces with the user to display a set of training protocols within the native application and prompts the user to elect a training protocol from the set. The mobile device or native application then queues the training protocol selected by the user at the training apparatus.

Alternatively, the training apparatus can be automatically preloaded with a default initial training protocol or default sequence of training protocols that the training apparatus executes automatically over a series of training sessions with the dog. In one implementation, the training apparatus can automatically execute a default sequence of training protocols including: a coarse sit protocol; a fine sit protocol; a lay down protocol; and then a stay protocol. Upon completion of the default sequence of training protocols with the animal, the mobile device or native application can interface with the user to elect a next training protocol, as described above.

2.3.2 Voice Command

Block S210 of the second method S200 recites: prompting a user to record a first audio clip of the user reciting a voice command associated with a target pose, the user affiliated with the animal. Generally, in Block S210 the mobile device or native application interfaces with the user to record the user speaking a prompt and to associate the recording with a command within a training protocol configured to train a domesticated animal to enter a particular target pose. The mobile device or native application then wirelessly transmits the recording and associated training protocol to the training apparatus in Block S212. For example, the mobile device or native application can prompt the user to recite the word "sit," record the user reciting this command, and associate this recording with a training protocol configured to train a dog to respond to sit commands; later, during an instance of a training session for the sit training protocol, the training apparatus can replay this recording and selectively dispense primary reinforcers (e.g., treats) for the dog responsive to detecting the dog entering a sit position within a limited duration of time following replay of this recording. Therefore, the training apparatus can leverage this recording to train the dog to sit responsive to the user's voice in particular, rather than responsive to other audio signals such as a generic voice, a factory-recorded voice, or a simple tone.

After initialization, the training apparatus operates autonomously throughout the day in the absence of the user. By accessing and replaying a voice recording of the user speaking a voice command associated with the current training protocol, the training apparatus can train the animal to the user's voice despite the absence of the user during the training session. Moreover, by providing the training apparatus with this audio recording, the user is no longer required to be present during the training sessions, allowing the dog to be occupied during daily periods of the user's absence.

In one implementation, the system plays back the recording and prompts the user to confirm the accuracy of the recording with the prompt for the voice command. Additionally, the mobile device or native application may prompt the user to record variations of the voice command (e.g. in different tones of voice), in different languages, or different wordings. The native application may then associate the variations of the voice command with variations of a single pose. In Block S216 of the method S200, after the user is satisfied with the recording or recordings, the mobile device or native application can crop the audio clip to remove silence at the beginning and end of the audio clip. By removing any pauses at the beginning of the recording, the training apparatus can accurately playback the voice command at the correct instant during the training sessions, which can eliminate the opportunity for latency errors during training that may delay the animal's training. The degree of association the dog makes between a command, a behavior, and a reward is inversely proportional to the amount of time between the behavior and the reward, and the command and the behavior.

In one implementation, the system records the user reciting a voice command and autonomously adjusts the phase and frequency of the recording to emulate a target quality of a voice command.

In one implementation, the training apparatus includes an integrated display. The integrated display projects a menu of options prompting the user to initialize the device. After the user selects the option to begin recording on the display, an integrated microphone on the training apparatus begins recording the user as the user recites voice commands. The training apparatus then stores these audio clips locally and uploads to these audio clips to cloud storage. The audio clips can then be downloaded to additional training apparatuses, to mobile devices running the native application, or to web-based applications accessible via login on any appropriate device.

2.3.3 Accessing Video Feed

Block S220 of the second method S200 recites: accessing a video feed recorded by an optical sensor during a first training session, the optical sensor integrated into the training apparatus and defining a field of view intersecting a working field. Generally, in Block S220, the system prompts the user to begin a training session through the native application on her mobile device or prompts her to select times or a block of time for training sessions. Once the user initiates the first training session, the training apparatus accesses onboard cameras, generally a color camera configured to output 2D color images (hereinafter "color images") and a depth camera configured to output 3D depth maps or point clouds (hereinafter "depth images"), and records the area in front of the training apparatus and stores a series of static images as references for defining the working field. In the case of a working field which already contains either the animal, the user, or any other non-static entities (e.g. non-users, other animals, or non-sentient yet mobile objects), the integrated or cloud-based processor utilizes AI/machine-learning/computer-vision techniques to identify and tag each non-static (or temporarily static) entity, as well as each static entity. The processor then wirelessly communicates with the cloud server and accesses a suite of reference data to define the animal, the user, and the working field autonomously. In another implementation, the training apparatus downloads data associated with a specific animal or breed of animal prior to the start of the first training session and stores the data locally on the training apparatus. In another implementation, the processor wirelessly transmits the data concerning the working field and the non-static entities to the user's mobile device, wherein the mobile device or native application prompts the user to identify each tagged entity as either the user, the animal, or something to ignore.

In another implementation, the user is prompted to move the training apparatus to different locations to create a comprehensive 3D map of a room the user has chosen as the primary training location. At the start of each training session, the training apparatus compares the initial view from the camera with the comprehensive 3D map in order to define the working field as within the primary training location. In another implementation, the training apparatus defines the working field as the view from the optical sensors.

2.3.4 Detecting the Animal

Block S222 of the second method S200 recites: in the video feed, detecting the animal within the working field. Generally, in Block S222, the system accesses onboard cameras and scans the area in front of the training apparatus for the animal. The working field may have been previously defined, or may be defined at the start of each training session. The processor on the training apparatus scans the video data from the training session and references either local data or cloud data to identify and tag the animal. Detecting the animal may include noting a moving object in the working field. Detecting the animal may also include defining elements associated with animals, (e.g., eyes, nose, mouth, legs, spine, etc.). In one implementation, the system detects and defines a dog by tagging nodes along the spine of the dog to create a dynamic spline.

2.3.5 Playing Voice Command

Block S230 of the second method S200 recites: while the animal is detected in the working field, playing back the first audio clip via an audio driver integrated into the training apparatus. Generally, in Block S230 the training apparatus accesses the audio clip recorded by the user which relates to the current training protocol and plays the audio clip through the integrated speakers of the training apparatus. For example, if the user has chosen a sit training protocol for a dog, the training apparatus outputs a recording of the user saying "sit" upon detection of a dog in the working field. In one implementation, the system plays a single recording of the of the user's voice command in each training session. In another implementation, the system can cycle through variations of the user's voice command throughout a single training session. For example, during a training session the system can play an unedited recording of the user saying "sit" in the first instance of outputting the voice command, and then play a second version of the recording of the user saying "sit" (e.g., wherein the system plays the recording at a slower speed) in the second instance of outputting the voice command. The system can then identify certain variations of the voice command that the dog responds to more quickly and later play those variations back to the user.

2.3.6 Detecting Current Pose

Block S240 of the second method S200 recites: in the video feed, detecting a current pose of the animal. Generally, in block S240 of the second method S200, the training apparatus can implement machine learning and computer vision methods and techniques to detect and track the pose of the dog in the working field. In one variation, the processor scans frames of the video feed for target markers associated with certain poses of the animal. The markers are defined by the processor based on predefined markers within exemplary poses stored locally on the training apparatus. For example, markers defining a dog's eyes, nose, and mouth may be grouped together to define the dog's head, and markers defining the dog's tail and each of a dog's paws may define the dog's body. The processor then records the relative position of each marker to define the dog's current pose.

2.3.7 Calculating Deviation

Block S250 of the second method S200 recites: calculating a deviation between the current pose of the animal and the target pose. Generally, in Block S250 the processor calculates a distance between the locations of each marker in the image captured from the video feed to a reference point, and then calculates the variance of the positions to each of a set of relative marker orientations that define a pose.

In one implementation, the training protocol defines a sit position based on the relative position of paw, tail, and head markers. The training apparatus detects the dog's markers for paw, tail, and head. For example, if the training apparatus detects that the markers for each of the dog's paws and the marker for the dog's tail are all intersecting with the ground plane, while the markers for the dog's head are at a distance above the ground plane approximately equal to the dog's height, the system can confirm that the dog is in a sitting position. In another example, if the markers for the dog's paws, tail, and mouth are all intersecting with the ground plane, the processor can confirm that the dog is in a laying position. If, in the above examples, the markers for the dog's head were at a point or points in between the ground plane and the distance above the ground plane equal to the dog's height, the processor can calculate the distance between the current position of the markers and the target position of the markers depending on the target pose (sitting or lying) for each selected frame of the video feed, and in the instance of the sit target position, dispense a primary reinforcer once the markers for the dog's head reached 90% of the dog's height. Additionally, the processor can calculate an average deviation between each marker and its respective target marker.

In another example, if in a first frame the markers for the dog's paws are below the markers for the dog's head and tail, and in a second frame the markers for the dog's paws are above the markers for the dog's head and tail, and in a third frame the markers for the dog's paws are once again below the markers for the dog's head and tail, the processor can confirm the dog to be rolling over.

In another implementation, the training apparatus defines the target pose based on the dog's spine profile relative to the ground plane. The system engages edge detection methods and techniques to detect the spine of the dog and then creates a spline to define the spine, and spline ranges, within bands of acceptable splines, define the target poses. The system accesses a broad range of permissible splines at the beginning of the training sessions, and a narrower range of permissible splines toward the end of the training sessions.

2.3.8 Primary Reinforcer and Secondary Reinforcer

Block S250 of the second method S200 recites: in response to the deviation falling within a threshold: playing a second audio clip S234 comprising a secondary reinforcer and dispensing a first unit of a primary reinforcer S260 via a dispenser integrated into the training apparatus. Generally, in Block S250 each training protocol defines an acceptable deviation threshold associated with the target pose, and when the animal's pose falls within that threshold, the training apparatus plays a secondary reinforcer through the onboard speaker (Block S234), and ejects a primary reinforcer to the animal (Block S260). In one variation, the system calculates that the current pose of the animal falls within 90% of the target pose, and dispenses a primary reinforcer to the animal. For example, after the optical sensors detect that the animal entered an acceptable form of the sit position, the integrated speakers output a recording of the user saying "good dog" and the dispenser ejects a primary reinforcer to the dog's feet.

Block S214 of the second method S200 recites: prompting the user to recite the secondary reinforcer comprising praise and recording the second audio clip during oral recitation of the praise by the user. Generally, in Block S214, the mobile device or native application interfaces with the user to record the user speaking a prompt and to associate the recording with a secondary reinforcer within a training session configured to train a domesticated animal to enter a particular target pose. For example, the mobile device or native application can prompt the user to recite the phrase "good dog" and record the user reciting this praise, and associate this recording with all training protocols or a subset of the training protocols. Later, during an instance of a training session, the training apparatus can replay this recording immediately prior to (or concurrently with, such as within one second of) dispensing primary reinforcers (e.g., treats) for the dog responsive to detecting the dog entering a sit position. The dog then associates receiving a primary reinforcer not only with performing the task, but also with hearing the praise. The positive association with the user/owner's praise allows the training apparatus and the user to eventually reward the dog with praise in lieu of a primary reinforcer. The system can prompt the user to record secondary reinforcers during the same period that the system prompts the user to record voice commands, or the system can display the prompts at different times throughout the training cycles to alleviate the initial burden on the user.

2.3.9 Updating Confidence Score

Block S256 of the second method S200 recites: in the video feed, detecting a second pose of the animal; calculating a deviation between the second pose of the animal and the target pose; updating a confidence score if the second pose exceeds the desired threshold; in response to the confidence score exceeding a target score, playing back the second audio clip comprising the secondary reinforcer; and dispensing the first unit of the primary reinforcer via the dispenser integrated into the training apparatus. Generally, in Block S256, the system continues to track the animal after detecting the animal in the target pose, detects a second pose of the animal, and calculates a deviation between the second pose of the animal and the target pose. If the second deviation and the first deviation both fall in a range defined by the training protocol, the training apparatus plays the secondary reinforcer from the integrated speaker and dispenses a first unit of the primary reinforcer. If the second deviation falls out of the range defined by the training protocol, the system can continue to execute Block S256 of the method until two adjacent deviations fall in range. For example, if the dog sits only momentarily during a training session running the sit training protocol, the system can detect that the dog is no longer sitting and withhold the first primary reinforcer until the dog remains in the sit position for at least two scan cycles. Thus, the dog is consistently rewarded only for fully executing the target pose.

2.3.10 Only My Voice

Block S232 of the second method S200 recites: accessing a third audio clip of an unknown second voice reciting the voice command. Generally, in Block S232, the training apparatus downloads a training protocol from a cloud server responsive to a user's instructions, and accesses a set of audio clips associated with the current training protocol. Each training protocol includes a set of prerecorded voice commands, which can be recorded by voice actors, or output by a robotic voice emulator. Additionally, the mobile device or native application may prompt the user to record voice commands by friends, family, and neighbors. The training apparatus plays the audio clips from the associated users during certain training protocols in order to train the dog to respond to other voices in addition to the user's voice.

Alternatively, the training apparatus may play non-user voice commands and withhold a primary reinforcer in Block S228 even if the dog performs the associated behavior. By selectively rewarding the animal only after playing the user's voice command, the dog is trained to only respond to the user. For example, if the system plays a recording of a voice actor reciting the voice command "sit" in Block S232 and the dog enters the sit pose, the system does not dispense a primary reinforcer in Block S228.

2.4 Visual Cue Initialization

Block S224 of the second method S200 recites: in response to detecting the animal in the working field, activating a visual cue for the duration of the first training session. Generally, in Block S224, the training apparatus accesses the optical sensors and scans the working field for the animal. Upon detection of the animal, the training apparatus displays a visual cue with the visual display to indicate to the animal that a training session is active. For example, the visual display can activate an LED array depicting the shape of a bone during training sessions. The training apparatus may also display the visual cue at the start of a training session when the animal is not detected in the working field.

The system can then implement Blocks S220, S222, S240, S250 and S260 (in the video feed, detecting a first current pose of the animal; calculating a first deviation between the first current pose of the animal and a target pose; in response to the first deviation falling within a threshold, dispensing a first unit of a primary reinforcer via a dispenser integrated into the training apparatus) as described above.

For dogs and/or users with full or partial hearing impairment, the training apparatus can prompt the user to record video of herself performing physical gestures as commands. The training apparatus can record the user via the camera on the user's mobile device or the integrated optical sensors on the training apparatus. In one implementation, the training apparatus provides the user with exemplary videos of physical commands associated with each training protocol.

Alternatively, the training apparatus can display the visual cue as a secondary reinforcer concurrently with dispensing the primary reinforcer.

2.5 Audio Cue Initialization

Block S242 of the second method S200 recites: in the video feed, detecting an initial posture of the animal associated with a transition into the target pose. Generally, in Block S242, the training apparatus accesses the optical sensors to view the working field and can implement methods and techniques to detect and track the poses of the dog in the working field. As the training apparatus tracks the animal, the processor identifies postures of the dog that indicate the dog is entering the target pose.

Blocks S236 and S262 of the second method S200 recite: in response to detecting an initial posture of the animal associated with a transition into the target pose, playing an audible cue associated with the target pose as the animal transitions into the target pose; and dispensing a second unit of the primary reinforcer. Generally, in Block S236, upon detection of an initial posture of the animal, the system outputs a tone in real-time before the animal fully transitions into the target pose. Upon recognition of an initial posture, the training apparatus outputs an audio cue in real-time, before the dog is in the target position. For example, if the training apparatus detects the dog bending its hind legs, the integrated speakers output a pleasing tone before the animal gets to the sit position, and subsequently the dispenser ejects a primary reinforcer to the dog S262 after the dog fully enters the sit pose.

In particular, the training apparatus can train the animal with audible tones—exclusive of visual cues and recordings of the user's voice—during a training session. For example, the training apparatus can detect—in the video feed—the dog beginning to crouch into a sitting position and then output an audible tone (e.g., a recording or synthetic emulation of fingers snapping, hands clapping, or a whistle; a pure tone) via the integrated speakers accordingly. The training apparatus can then dispense a primary reinforcer upon detecting the dog fully entering the sit position, thereby reinforcing an association between the audible tone and the sit position for the dog. The training protocols can include a set of tones output by the training apparatus in lieu of a recording of the user's voice if the user has not yet recorded voice commands.

2.6 Audio Cue Training

Blocks of the second method S200 recite: in the video feed, detecting a second current pose of the animal; calculating a second deviation between the second current pose of the animal and the target pose; in response to the second deviation falling outside of the threshold, playing the audible cue; initiating a timer for a fixed interval; in the video feed, detecting a third current pose of the animal; calculating a third deviation between the third current pose of the animal and the target pose; in response to the third deviation falling within the threshold prior to an expiration of the fixed interval, immediately dispensing a third unit of the primary reinforcer. Generally the system continues to record the working field with the optical sensors after the animal initially enters the target pose, and tracks the animal in subsequent poses; the system accesses anatomical definitions of poses for the animal and calculates a variance between the animal's current pose and the anatomical definitions of the target pose to confirm that the animal is no longer in the target pose. Upon detection of the animal in a pose other than the target pose, the system plays the audio cue and starts a timer. The system continues to track the animal in the working field until the animal enters the target pose, and then immediately dispenses a primary reinforcer to the animal responsive to the animal entering the target pose. If the timer expires prior to the animal entering the target pose, the system plays the audible cue an additional time and restarts the timer for the fixed interval.

In one implementation, the system detects a dog in a standing pose, and calculates that the standing pose is outside of the threshold of a sitting pose. The system then replays the tone associated with the sit training protocol, and tracks the dog until the dog sits. Upon detection of the dog entering the sit pose, the training apparatus dispenses a primary reinforcer to the dog. The system can also play a second tone as a secondary reinforcer concurrently with dispensing the primary reinforcer.

In one variation, the training apparatus incrementally reduces the fixed interval down to a target interval after dispensing the third unit of the primary reinforcer. Then, in response to the third deviation falling within the threshold prior to the expiration of the target interval, the training apparatus can: prompt a user to record a first audio clip of the user reciting a voice command associated with a target pose, the user affiliated with the animal; access a video feed recorded by an optical sensor during a first training session, the optical sensor integrated into the training apparatus and defining a field of view intersecting a working field; and detect the animal within the working field via the video feed. Finally, while the animal is detected in the working field, the training apparatus can: playback the first audio clip via an audio driver integrated into the training apparatus; in the video feed; detect a current pose of the animal; calculate a deviation between the current pose of the animal and the target pose; and play a second audio clip comprising a secondary reinforcer and dispense a first unit of a primary reinforcer via a dispenser integrated in response to the deviation falling within a threshold.

Generally, the system reduces the fixed interval until the animal reaches a target latency between the audible cue and entering the target pose. The system then transitions from training the animal with the audible cue to training the animal with a voice command as in Block S230 of the second method S200. In one implementation, the system transitions from audible cue to voice command by playing the voice command at a low volume concurrently with playing the audible cue at a normal volume. The system gradually increases the volume of the voice command and decreases the volume of the audible cue until the voice command is the only sound played by the speaker.

3. Third Method—Reinforcement Schedules

As shown in FIG. 5, a third method S300 for autonomously training an animal to respond to oral commands includes: during a first reinforcement cycle within a first training session, outputting an audible cue corresponding to a target action in Block S312; and, in a video feed, detecting completion of the target action by the animal in Block S314. Then, also during the first reinforcement cycle and in response to detecting completion of the target action by the animal, the training apparatus can: dispense a first unit of a primary reinforcer in Block S316; and initiate a timer for a fixed interval between dispensation of consecutive units of the primary reinforcer in Block S340. The third method S300 also includes, during a second reinforcement cycle succeeding the first reinforcement cycle within the first training session: outputting the audible cue in Block S322; and in the video feed, tracking the animal in Block S324. In response to detecting completion of the target action by the animal prior to expiration of the timer, the training apparatus can: output a second audio clip comprising a secondary reinforcer in Block S326; dispense a second unit of the primary reinforcer in Block S328; and reinitiate the timer for the fixed interval between dispensation of consecutive units of the primary reinforcer in Block S340. In response to expiration of the timer prior to detecting completion of the target action by the animal, the training apparatus can: dispense a second unit of the primary reinforcer in Block S328; output the audible cue in Block S322; and reinitiate the timer for the fixed interval between dispensation of consecutive units of the primary reinforcer in Block S340.

3.1 Applications

Generally, the third method S300 can be executed by the training apparatus described above to implement concurrent schedules for reinforcing both a dog's engagement with the training apparatus and its response to audible and or visual cues. In particular, dogs can disengage from (e.g., walk away from) the training apparatus when reinforcer dispense frequency drops below a threshold. For example, a dog under six months old may disengage from the training apparatus after 60 seconds of not receiving a primary reinforcer from the training apparatus; similarly, a dog over six years old may disengage from the training apparatus after 120 seconds of not receiving a primary reinforcer from the training apparatus. Therefore, the training apparatus can execute Blocks of the third method S300—concurrently with Blocks of the second method S200 described above—to ensure that primary reinforcers are dispensed to the dog at a frequency likely to maintain the dog's engagement (or "keep the dog's attention") with the training apparatus throughout the full duration of a training session.

For example, small dogs, young dogs, less food-oriented dogs, dogs with shorter attention spans, and dogs failing to quickly identify causation between poses and primary reinforcers may lose interest in the training apparatus before entering a pose indicated by the current training protocol and may therefore exit the working field prior to completion of the current training session. Therefore, the training apparatus can concurrently execute a training protocol that establishes: a base reinforcer schedule for reinforcing target behaviors with primary reinforcers; and a parallel schedule in which the training apparatus dispenses non-contingent rewards based on maximum time durations between reinforcement cycles. For example, during a training session for a particular pose (or behavior, task), the training apparatus outputs a command and starts a timer for 30 seconds; if the training apparatus fails to detect the dog in the particular pose upon expiration of the timer, the training apparatus can dispense a primary reinforcer to the dog despite the dog's failure to enter the specified pose. The training apparatus can also increase the duration of the timer, such as from 30 seconds to 60 seconds, then 90 seconds, and then 120 seconds as the training session progresses and/or as the dog develops a relationship with the training apparatus.

3.2 Fixed Interval Reinforcement

In one implementation, Blocks of the third method S300 recite, during a first reinforcement cycle within a first training session: outputting an audible cue corresponding to a target action; and—in a video feed—detecting completion of the target action by the animal. Then, in response to detecting completion of the target action by the animal: dispensing a first unit of a primary reinforcer; and initiating a timer for a fixed interval between dispensation of consecutive units of the primary reinforcer. Generally, the system executes a first reinforcement cycle based on a fixed interval between dispensation of primary reinforcers. The system plays an audible cue based on the current training protocol, detects the animal completing the target action for the first time, dispenses a primary reinforcer, and starts a timer for a fixed interval. In one implementation, the system plays a tone associated with the sit position of a dog; detects the dog sitting; ejects a primary reinforcer to the dog; and starts a timer for 30 seconds. At the conclusion of the 30 seconds, an additional primary reinforcer is ejected to the dog regardless of whether the dog completes the target pose an additional time.

Additional Blocks of the third method S300 recite: during a second reinforcement cycle succeeding the first reinforcement cycle within the first training session: outputting the audible cue; in the video feed, tracking the animal; in response to detecting completion of the target action by the animal prior to expiration of the timer, outputting a second audio clip comprising a secondary reinforcer; dispensing a second unit of the primary reinforcer; and reinitiating the timer for the fixed interval between dispensation of consecutive units of the primary reinforcer. Generally, the system executes Blocks of the second reinforcement cycle of the third method S300 based on the animal successfully completing the target pose. The system tracks the poses of the animal as in the first reinforcement cycle, dispenses a primary reinforcer each time the animal enters the target pose, and restarts the timer after each dispensation.

Additional Blocks of the method S300 recite: during the second reinforcement cycle succeeding the first reinforcement cycle within the first training session, in response to expiration of the timer prior to detecting completion of the target action by the animal, dispensing a second unit of the primary reinforcer; outputting the audible cue; and reinitiating the timer for the fixed interval between dispensation of consecutive units of the primary reinforcer. Generally, the system also executes Blocks of the second reinforcement cycle of the third method S300 based on the expiration of a dynamic fixed time-interval. The system tracks the poses of the animal as in the first reinforcement cycle, dispenses primary reinforcers (e.g., treats) each time the fixed time-interval lapses, and restarts the timer after each dispensation.

In another embodiment, the concurrent schedules may relate to each other directly, wherein the fixed interval schedule can reduce or extend the interval based on the quality of the targeted behavior. For example, if the dog performs the sit pose with a minimum latency response time during a sit training protocol, then the system can increase the fixed interval.

3.3 Maximum Interval

Block S376 of the method S300 recites: incrementally increasing the fixed interval up to a maximum interval between dispensation of consecutive units of the primary reinforcer. Generally, in Block S376, the system increases the fixed interval after each dispensation until a set maximum interval. In one implementation, the system defines the fixed interval as 30 seconds after a first dispensation. The system then defines the fixed interval as 60 seconds after the second dispensation, 90 seconds after the third dispensation, and 120 seconds after the fourth dispensation. In this implementation, the system defines the maximum interval as 120 seconds. For any dispensation after the fourth dispensation, the system initiates the timer for 120 seconds. Thus, the dog does not wait more than 120 seconds without receiving a primary reinforcer, and remains near to and engaged with the training apparatus. The system can define the maximum interval based on animal qualities, e.g., species, breed, size, and/or age.

4. Training Protocols

In variations of the methods described above, the system can execute a suite of training protocols, each associated a target animal behavior, during training sessions with a dog.

4.1 Barking Cessation

In one implementation, the training apparatus executes a barking cessation session with the dog. During a first segment of the barking cessation session, the training apparatus can: record a first audio signal via a microphone integrated into the training apparatus; calculate a first frequency of an animal vocalization in the first audio signal; and store the first frequency of the animal vocalization as a first baseline frequency. During a second segment of the barking cessation session, the training apparatus can: record a second audio signal via the microphone; calculate a second frequency of the animal vocalization in the second audio signal; and then play back the second audio clip, dispensing a second unit of the primary reinforcer via the dispenser, and store the second frequency of the animal vocalization as a second baseline frequency in response to the second frequency of the animal vocalization falling below a fraction of the baseline frequency.

Generally, in this implementation, the system records an animal vocalization, and dispenses a primary reinforcer if the animal begins to vocalize less. For example, the system can prompt the user to place the training apparatus near an area of a home where a dog frequently barks. Throughout the day, the training apparatus detects the dog barking, records for a fixed time period, and establishes a baseline bark-per-minute rate. The system continues to record the dog barking, and if during any subsequent time period the dog barks at lower bark-per-minute rate, the dog is rewarded with a primary reinforcer, and the system establishes the lower bark-per-minute rate as the new baseline rate. Thus, the dog associates barking less with receiving rewards.

4.2 Location-Based Training

In one implementation, the training apparatus executes location-based training. During a first segment of the location-based training session, the training apparatus can: prompt the user to define a primary engagement location for the training apparatus; prompt the user to define a first training protocol associated with the primary engagement location for the training apparatus; prompt the user to place the training apparatus near the primary engagement location during the first training session; prompt the user to define a second training area associated with a common frequency of the animal vocalization; and prompt the user to place the training apparatus near the second training area during the second training session.

Generally, the system prompts the user to place the training apparatus in a desired primary location for training, and then prompts the user to select a primary training protocol. The system then prompts the user to place the training apparatus in a second location and prompts the user to select training protocols that the user wants to associate with the second location. The system can then automatically select appropriate training protocols simply by scanning the working field and identifying the working field as one of the defined training areas. For example, the user can select the living room of her home for a primary training location for the sit training protocol, and select the entryway of her home for a barking cessation training protocol.

In another implementation, the training apparatus includes wheels and/or treads, and moves from one training location to another training location autonomously. The system can also include an integrated battery and a charging station. In yet another implementation, the training apparatus includes GPS or other geo-location technology, and executes the location-based training in response to the GPS data.

4.3 Calling Animal to Working Field

In one implementation, the training apparatus can call the animal to the working field. At a scheduled start time for the first training session, the training apparatus can: activate a visual cue; in the video feed, detect the absence of the animal in the working field at a first time; in response to detecting absence of the animal in the working field, play back the first audio clip; in the video feed, detect the animal in the working field at a second time succeeding the first time; and, in response to detecting the animal in the working field, play back the second audio clip; and dispense an initial unit of the primary reinforcer.

Generally, the system activates a visual cue in response to an internal timer indicating a start time of a training session associated with a training protocol. If the training apparatus does not detect an animal in the working field, the system outputs an audio clip through the integrated speakers. The training apparatus continues to monitor the working field until the optical sensors detect the animal entering the working field. Once the system detects the animal, the training apparatus dispenses a unit of the primary reinforcer.

In one implementation, the system initializes a come training protocol. The system accesses the integrated cameras and detects that the dog is not in front of the training apparatus. The system outputs the voice command "come" through the integrated speakers. Once the system detects the animal in front of the training apparatus, the training apparatus dispenses a primary reinforcer and outputs the secondary reinforcer "good dog" through the speakers.

In another implementation, the training apparatus can also access cameras and/or speakers located around the house, e.g. a preexisting security system, a set of cameras, or a set of personal robotic assistants. The system can access the remote cameras and implement certain behavior-specific protocols based on the animal's behavior in different locations.

4.3 Animal Anatomical Definitions

Variations of the methods described above include training protocols associated with particular animal species and/or breeds.
4.3.1 Training a Dog
In one implementation, the training apparatus can detect a dog in the video feed, and access a canine anatomical definition of a target pose (e.g., a dog sit pose). Generally, the training apparatus accesses an appropriate anatomical definition defined by the current training protocol. The system can store the anatomical definition locally on the training apparatus after the processor wirelessly downloads the definition from a set of anatomical definitions stored remotely. For example, the training apparatus prompts the user to select a training protocol from her mobile device. The user selects "dog" as the animal, and "sit" as the training protocol. The mobile device or native application then wirelessly instructs the training apparatus to download and locally store the "dog-sit" training protocol.

In one implementation, the system can access a general "dog" anatomical definition and select training protocols appropriate for any dog type. In another implementation, the system can access specific "dog" anatomical definitions based on dog qualities, (e.g., breed, size, weight, health, etc.). For example, the mobile device or native application can prompt the user to select the breed and age of the animal before the start of the first training session. Alternatively, the system can autonomously detect the breed and age of the animal using computer vision techniques and automatically select appropriate training protocols based on the detected breed and age.
4.3.2 Training Other Animals
In another implementation, the system can access training protocols for a variety of domesticated animals, e.g., cats, birds, reptiles, pigs, horses, cattle. For example, the system can identify the animal as a cat and engage an integrated laser pointer on the training apparatus to execute a training protocol.

In yet another implementation, the system can prompt a user to set up the training apparatus outside of the user's home to train wild animals, e.g., raccoons, squirrels, bears etc.

4.4 Variations of Training Protocols

The training apparatus 100 can implement similar methods and techniques to output other audible queues to an animal of any other type, to rapidly detect other poses or series of poses or behaviors by this animal (e.g. rolling over or emitting a sound), and to output positive reinforcement (e.g., by dispensing primary reinforcers) for the animal in order to train the animal to respond to various oral commands by performing indicated behaviors.

Once a new profile is created for the user's dog, the native application can prompt the user to recite various oral commands for the dog and record these oral commands. For example, the native application can prompt the user to orally recite her preferred forms of various oral commands including: "watch me"; "sit"; "down"; "stand"; "stay"; "heel"; "wait"; "come"; "drop it"; and/or "crate"; etc. During this setup process, the native application can: record a discrete soundbite as the user recites each of these oral commands and a name of her dog; and tag each of these soundbites with a tag for the corresponding command or pet name. The native application can then upload these tagged soundbites to the training apparatus 100 (e.g., directly via a local ad hoc wireless network).

4.5. Dispenser Protocols

Variations of methods described above can include dispenser protocols associated with certain training protocols.
4.5.1 Dispensing to Target Location
In one implementation, the system can detect the location of the animal by accessing the optical sensors and assigning x, y, z, coordinates to the location. In another implementation, the system can implement other coordinate systems, e.g., polar, cylindrical, spherical, etc. In response to detecting the current location of the animal, the training apparatus can dispense the first unit of the primary reinforcer to a target location associated with the target pose of the animal. In one implementation, the user selects a sit training protocol. Upon detection of the dog entering the sit pose, the system dispenses the primary reinforcer to the front feet of the dog, so the dog does not need to leave the sit position to retrieve the primary reinforcer. The system then dispenses a primary reinforcer to a second location away from the dog, so the dog must leave the sit position in order to retrieve the primary reinforcer. Thus, the system can output the sit command again during the training session after the dog leaves the first sit position.

In another implementation, if the system detects that the animal is too close to the training apparatus, the training apparatus can dispense a primary reinforcer behind the animal to coax the animal further out into the working field. Or, conversely, if the animal is too far away, the system can dispense a primary reinforcer closer to the training apparatus to coax the animal closer. For example, the system can define proximity bands or radial zones in the working field at radii of 0.5 m, 1 m, 1.5 m, 2 m, etc. The system can output the voice command "come" and dispense a primary reinforcer into a proximity band closer to the training apparatus than the proximity band currently occupied by the animal.

In another implementation, the dispenser is configured to dispense and receive tennis balls or toys during a "fetch" training protocol.

4.5.2 Calibrating Dispenser

In one implementation, the system can execute a dispenser calibration protocol. Generally, the training apparatus can: dispense the primary reinforcer to a target location; in the video feed, detect a snooping pose of the animal and subsequently detect a chewing pose of the animal. The system then defines the location of the snooping pose immediately preceding the chewing pose as the location of the primary reinforcer. The system then calibrates the target trajectory of the dispenser according to the location of the primary reinforcer.

Generally, the system dispenses a unit of the primary reinforcer and tracks the animal searching for the primary reinforcer and subsequently eating the primary reinforcer. For example, the system dispenses a primary reinforcer to a target location away from the dog. The system will record frames of the dog searching for the primary reinforcer, and upon detecting the dog eating the primary reinforcer, the system flags the last location that the dog searched prior to eating the primary reinforcer as the location of the primary reinforcer. The system can then update trajectory protocols of the dispenser accordingly.

4.6. Sound Sensitive Animals

Additionally, the training apparatus can train sound sensitive animals to acclimate to, and positively associate with, trigger noises commonly found objectionable. In one implementation, after an initial training period, the system can introduce a target noise at a low volume during a training session. For example, the system can play a recording of the sound of a vacuum cleaner at volume almost indiscernible to the dog at the start of a training session. The system can then slowly increase the volume of the recording during the training session to acclimate the animal to the trigger noise.

In another implementation, the system plays a sound clip of the trigger noise concurrently with dispensation of a primary reinforcer. The system can track the reaction of the animal to the sound clip and modify the volume/duration of the sound clip if the animal does not accept the primary reinforcer as a result of the sound clip of the trigger noise. Moreover, the system can also assist animals with general developmental issues, e.g. separation anxiety.

4.6.1 Masking Dispenser Noise

The speaker may also be used to output sounds to mask other sounds generated by the training apparatus that may cause sound sensitive animals to disengage with the training apparatus. For example, clicks and whirring generated by the treat reloading mechanisms may frighten certain animals. To avoid this, the speaker may generate a white or pink noise at a low volume and slowly increase the volume in anticipation of the reloading mechanism engaging.

In one variation, the training apparatus loads the dispenser with the first unit of the primary reinforcer concurrently with playing of the second audio clip during a first time-interval. The training apparatus then dispenses the first unit of the primary reinforcer during a second time interval succeeding the first time-interval. To reload the dispenser, the training apparatus can activate the reload mechanism, which may generate noise (e.g., "clicking," "whirring") that frightens the dog, triggers the dog to retreat from the training apparatus prior to conclusion of the training session, and/or prompts the dog to develop a negative association with the training apparatus. Therefore, the training apparatus can reload the dispenser while outputting the second audio clip or other audible reinforcer at a volume about the noise floor of the reload mechanism in order to mask noise generated by the reload mechanism and thus reduce likelihood that the dog is frightened by the training apparatus.

In another variation, the training apparatus dispenses the first unit of the primary reinforcer concurrently with playing of the second audio clip during a first time-interval; and reloads the dispenser with a second unit of the primary reinforcer during a second time interval succeeding the first time-interval.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for autonomously training an animal with a training apparatus, comprising:

loading a training protocol, from a set of training protocols, onto the training apparatus;

loading a first audio clip comprising recitation of a voice command associated with a target pose corresponding to the training protocol onto the training apparatus, the voice command recited by a user affiliated with the animal; and during a first training session:

accessing a video feed recorded by an optical sensor integrated into the training apparatus and defining a field of view intersecting a working field;

tracking a location of the animal within the working field in the video feed;

at a target frequency, updating a position of a dispenser, integrated into the training apparatus and configured to dispense units of a primary reinforcer into the working field, based on the location of the animal within the working field in the video feed; and while the animal is detected in the working field, playing back the first audio clip via an audio driver integrated into the training apparatus;

at a first time during the first training session:

detecting the animal at a first location within the working field in the video feed;

in response to detecting the animal at the first location:

calculating a first target location for dispensation of the primary reinforcer into the working field, via the dispenser, based on the first location of the animal; and locating the dispenser in a first position aligned to the first target location; and detecting a first pose of the animal in the video feed;

calculating a deviation between the first pose and the target pose; and in response to the deviation falling within a threshold deviation, dispensing a first unit of the primary reinforcer toward the first target location via the dispenser in the first position; and at a second time succeeding the first time during the first training session:

detecting the animal at a second location within the working field in the video feed, the second location offset the first location by a first distance; and in response to detecting the animal at the second location:

calculating a second target location for dispensation of the primary reinforcer into the working field, via the dispenser, based on the second location of the animal; and locating the dispenser in a second position aligned to the second target location;

detecting a second pose of the animal in the video feed;

calculating a second deviation between the second pose and the target pose; and in response to the second deviation falling within the threshold deviation, dispensing a second unit of the primary reinforcer toward the second target location via the dispenser in the second position.

2. The method of claim 1:

wherein loading the training protocol onto the training apparatus comprises loading the sit training protocol onto the training apparatus;

32 wherein loading the first audio clip comprising recitation of the voice command associated with the target pose comprises loading the first audio clip comprising recitation of the voice command associated with a target sit pose; and wherein updating the position of the dispenser based on the location of the animal comprises aligning the position of the dispenser with a target location for dispensation of the primary reinforcer calculated based on the location of the animal and the target sit pose.

3. The method of claim 1:

wherein locating the dispenser in the first position aligned to the first target location comprises locating the dispenser in the first position aligned to the first target location, the dispenser preloaded with the first unit of the primary reinforcer; and in response to dispensing the first unit of the primary reinforcer, reloading the dispenser with the second unit of the primary reinforcer at a third time preceding the second time.

4. The method of claim 1:

wherein updating the position of the dispenser based on the location of the animal within the working field in the video feed comprises updating the position of the dispenser based on the target pose and the location of the animal within the working field in the video feed;

wherein calculating the first target location for dispensation of the primary reinforcer based on the first location of the animal comprises calculating the first target location for dispensation of the primary reinforcer based on the first location of the animal and the target pose associated with the voice command; and wherein calculating the second target location for dispensation of the primary reinforcer into the working field based on the second location of the animal comprises calculating the second target location for dispensation of the primary reinforcer into the working field based on the second location of the animal and the target pose associated with the voice command.

5. The method of claim 4:

wherein loading the training protocol onto the training apparatus comprises loading the sit training protocol onto the training apparatus;

wherein loading the first audio clip comprising recitation of the voice command associated with the target pose comprises loading the first audio clip comprising recitation of the voice command associated with a target sit pose;

wherein calculating the first target location based on the first location of the animal and the target pose comprises calculating the first target location based on the first location of the animal and the target sit pose associated with the sit command;

wherein locating the dispenser in the first position aligned to the first target location comprises locating the dispenser in the first position aligned to the first target location and the target sit pose;

wherein dispensing the first unit of the primary reinforcer toward the first target location comprises dispensing the first unit of the primary reinforcer toward the first target location proximal the feet of the animal in the first pose;

wherein calculating the second target location based on the second location of the animal and the target pose associated with the voice command comprises calculating the second target location based on the second location of the animal and the target sit pose associated with the sit command; and wherein locating the dispenser in the second position aligned to the second target location comprises locating the dispenser in the second position aligned to the second target location and the target sit pose.

6. The method of claim 5, further comprising, in response to dispensing the first unit of the primary reinforcer toward the first target location proximal the feet of the animal in the first pose, dispensing a second third unit of the primary reinforcer toward a second target location away from the current location of the animal.

7. The method of claim 1:

wherein detecting the animal within the working field comprises detecting a dog;

further comprising accessing a canine anatomical definition of the target pose; and wherein calculating the deviation between the current pose of the animal and the target pose comprises calculating the deviation between the current pose of the dog and the canine anatomical definition of the target pose.

8. The method of claim 1:

wherein calculating the first target location based on the first location of the animal comprises calculating the first target location based on the first location of the animal and the target pose; and wherein calculating the second target location based on the second location of the animal comprises calculating the second target location based on the second location of the animal and the target pose.

9. The method of claim 1:

further comprising, in response to the deviation falling within the threshold deviation, playing a second audio clip comprising praise during a first time-interval; and wherein dispensing the first unit of the primary reinforcer comprises dispensing the first unit of the primary reinforcer concurrently with playing of the second audio clip during the first time-interval.

10. The method of claim 9, further comprising:

reloading the dispenser with the second unit of the primary reinforcer during a second time-interval succeeding the first time-interval; and replaying the second audio clip concurrently with reloading of the dispenser during the second time-interval.

11. The method of claim 1:

further comprising, at a scheduled start time for the first training session, activating a visual cue at the training apparatus;

at a third time preceding the first time, detecting absence of the animal in the working field in the video feed;

in response to detecting absence of the animal in the working field, playing back the first audio clip;

at a fourth time succeeding the third time and preceding the first time, detecting the animal within the working field in the video feed; and in response to detecting the animal in the working field at the third time:

playing back the second audio clip; and dispensing an initial unit of the primary reinforcer.

12. The method of claim 1, wherein updating the position of the dispenser at the target frequency comprises, at the target frequency, updating the position of the dispenser comprising:

updating a first angular position of the dispenser in a vertical plane; and updating a second angular position of the dispenser in a horizontal plane.

13. The method of claim 1:

wherein tracking the location of the animal in the working field comprises:

tracking a longitudinal distance of the animal from the optical sensor; and tracking a lateral distance of the animal from the optical sensor; and wherein updating the position of the dispenser based on the location of the animal in the working field comprises updating the position of the dispenser based on the longitudinal distance and the lateral distance.

14. The method of claim 1, wherein updating the position of the dispenser at the target frequency comprises updating the position of the dispenser at the target frequency within a threshold deviation of 30 Hz.

15. A method for autonomously training an animal with a training apparatus, comprising:

during a first training session, accessing a video feed recorded by an optical sensor integrated into the training apparatus and defining a field of view intersecting a working field;

during a first reinforcement cycle within the first training session:

outputting an audible cue associated with a target action;

detecting a first action completed by the animal in the video feed; and in response to the first action falling within a threshold deviation of the target action:

dispensing a first unit of a primary reinforcer into the working field via a dispenser integrated into the training apparatus; and in response to dispensing the first unit of the primary reinforcer, initiating a timer for a first fixed interval between dispensation of consecutive units of the primary reinforcer; and during a second reinforcement cycle succeeding the first reinforcement cycle within the first training session:

outputting the audible cue;

detecting a second action completed by the animal in the video feed;

in response to the second action falling within the threshold deviation of the target action prior to expiration of the timer:

dispensing a second unit of the primary reinforcer into the working field; and in response to dispensing the second unit of the primary reinforcer, reinitiating the timer for the first fixed interval; and in response to expiration of the timer:

dispensing a third unit of the primary reinforcer into the working field; and reinitiating the timer for a second fixed interval.

16. The method of claim 15:

wherein reinitiating the timer for the second fixed interval comprises reinitiating the timer for the second fixed interval exceeding the first fixed interval in duration; and further comprising, during a third reinforcement cycle succeeding the second reinforcement cycle within the first training session:

outputting the audible cue;

detecting a third action completed by the animal in the video feed;

in response to the third action falling within the threshold deviation of the target action:

dispensing a fourth unit of the primary reinforcer into the working field; and in response to dispensing the fourth unit of the primary reinforcer, reinitiating the timer for the second fixed interval; and in response to expiration of the timer:

dispensing a fifth unit of the primary reinforcer into the working field; and reinitiating the timer for a third fixed interval exceeding the second fixed interval in duration.

17. A method for autonomously training an animal with a training apparatus, comprising:

during a training session for the animal:

activating a visual cue at the training apparatus; and accessing a video feed recorded by an optical sensor integrated into the training apparatus and defining a field of view intersecting a working field;

tracking a location of the animal within the working field in the video feed; and updating a position of a dispenser, integrated into the training apparatus and configured to dispense units of a primary reinforcer into the working field, based on the location;

at a first time during the training session, in response to detecting absence of the animal within the working field in the video feed, playing back an audible cue via an audio driver integrated into the training apparatus; and at a second time during the training session, in response to detecting the animal within the working field in the video feed:

playing back a first audio clip associated with a target pose; and in response to playing back the first audible cue:

initiating a timer for a first fixed interval;

tracking a current pose of the animal in the video feed;

tracking a difference between the current pose and the target pose;

in response to the difference falling below a threshold difference, confirming execution of the target pose; and in response to confirming execution of the target pose prior to expiration of the timer:

dispensing a first unit of a primary reinforcer into the working field toward the location of the animal via the dispenser arranged in a first position aligned to the location of the animal;

reducing the first fixed interval to a second fixed interval less than the first fixed interval; and initiating the timer for the second fixed interval.

18. The method of claim 17, further comprising, in response to expiration of the timer prior to confirming execution of the target pose:

playing back the first audio clip associated with target pose;

reinitiating the timer for the first fixed interval;

tracking the current pose of the animal in the video feed;

tracking the difference between the current pose and the target pose;

in response to the difference falling below the threshold difference, confirming execution of the target pose; and in response to confirming execution of the target pose prior to expiration of the timer:

dispensing a second unit of the primary reinforcer into the working field;

reducing the first fixed interval to the second fixed interval; and initiating the timer for the second fixed interval.

19. The method of claim 17:

wherein playing back the audible cue in response to detecting absence of the animal within the working field in the video feed comprises:

at a first time during the training session, detecting absence of the animal within the working field; and in response to detecting absence of the animal in the working field at the first time, playing back the audible cue; and wherein playing back the first audio clip in response to detecting the animal within the working field further comprises:

at a second time succeeding the first time during the training session, detecting the animal within the working field;

in response to detecting the animal within the working field at the second time, dispensing an initial unit of a primary reinforcer into the working field; and while the animal is detected within the working field, playing back the first audio clip.

20. The method of claim 17:

wherein updating the position of the dispenser based on the location of the animal within the working field comprises, at a target frequency:

calculating a target location for dispensation of the primary reinforcer into the working field based on the current location of the animal within the working field; and updating the position of the dispenser based on the target location; and wherein dispensing the first unit of the primary reinforcer into the working field toward the location of the animal comprises dispensing the first unit of the primary reinforcer toward the target location within a threshold distance of the location of the animal within the working field.

* * * * *